US012425497B1

(12) United States Patent
Bharadwaj et al.

(10) Patent No.: US 12,425,497 B1
(45) Date of Patent: Sep. 23, 2025

(54) INTERNET PROTOCOL (IP) SWITCH-BASED ANALYTICS MANAGEMENT

(71) Applicant: Cisco Technology, Inc., San Jose, CA (US)

(72) Inventors: Harsha Bharadwaj, Bangalore (IN); Ayan Banerjee, Fremont, CA (US); Ramesh Sivakolundu, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/615,553

(22) Filed: Mar. 25, 2024

(51) Int. Cl.
*H04L 69/163* (2022.01)
*G06F 13/42* (2006.01)
*H04L 69/22* (2022.01)

(52) U.S. Cl.
CPC ........ *H04L 69/163* (2013.01); *G06F 13/4282* (2013.01); *H04L 69/22* (2013.01); *G06F 2213/0026* (2013.01)

(58) Field of Classification Search
CPC ... H04L 69/163; H04L 69/22; G06F 13/4282; G06F 2213/0026
See application file for complete search history.

(56) References Cited

U.S. PATENT DOCUMENTS

| 12,052,092 | B1* | 7/2024 | Raman | H04J 3/0638 |
|---|---|---|---|---|
| 2015/0063349 | A1* | 3/2015 | Ardalan | H04L 45/38 370/381 |
| 2021/0397359 | A1 | 12/2021 | Richardson | |
| 2022/0191306 | A1* | 6/2022 | Radi | H04L 69/163 |
| 2022/0377027 | A1 | 11/2022 | Gai et al. | |
| 2023/0046221 | A1* | 2/2023 | Pismenny | H04L 12/413 |
| 2023/0068914 | A1 | 3/2023 | Srinivasan et al. | |

\* cited by examiner

*Primary Examiner* — Jerry B Dennison
(74) *Attorney, Agent, or Firm* — Lee & Hayes, P.C.

(57) ABSTRACT

This disclosure describes techniques for performing Internet Protocol (IP) switch-based Storage Area Networks (SANS) analytics management. An example method is performed by an IP switch. The method includes identifying information associated with Non-Volatile Memory express (NVMe)/Transport Control Protocol (TCP) Protocol Data Units (PDUs) examined from an Application-Specific Integrated Circuit (ASIC) data path. The information can be stored based on the NVMe/TCP PDUs being included in separate corresponding TCP data segments, according to a handshake protocol. Alternatively or additionally, the information can be stored based on a metadata header being received as a first PDU in a TCP segment. The NVMe/TCP PDUs can be used to extract the information to populate connection and IO tables inside an ASIC. The storage I/O metrics may then be available from the tables.

20 Claims, 11 Drawing Sheets

| VLAN/PORT | HOST IP | TARGET IP | SOURCE PORT | LOCAL ID | NSID | BYTES REMAIN INGRESS, EGRESS | PDU CACHE | CONNECTION METRICS LIST |
|---|---|---|---|---|---|---|---|---|
| 1, ETH1/1 | 1.1.1.1 | 2.2.2.2 | 10001 | 4000 | 1 | B1, B2 | <PDU> | M1,M2...MN |
| 1, ETH1/1 | 1.1.1.1 | 3.3.3.3 | 10002 | 4001 | 1 | B3, B4 | <PDU> | M1,M2...MN |
| ... | | | | | | | | |

CONNECTION TABLE 700

| VLAN/PORT | HOST IP | TARGET IP | SOURCE PORT | LOCAL ID | COMMAND ID | NSID | IO STATE |
|---|---|---|---|---|---|---|---|
| 1, ETH1/1 | 1.1.1.1 | 2.2.2.2 | 10001 | 4000 | 1 | B1, B2 | S1,S2,...,SN |
| 1, ETH1/1 | 1.1.1.1 | 3.3.3.3 | 10002 | 4001 | 1 | B3, B4 | S1,S2,...,SN |
| ... | | | | | | | |

IO TABLE 702

```
┌─────────────────────────────────────────────────────────────┐
│  RECEIVE AT LEAST ONE TRANSPORT CONTROL PROTOCOL (TCP) DATA │
│                           SEGMENT                            │
│                             808                              │
└─────────────────────────────────────────────────────────────┘
                               │
                               ▼
┌─────────────────────────────────────────────────────────────┐
│  IDENTIFY INFORMATION ASSOCIATED WITH NVME (NVME)/TCP PDUS, BASED
│  ON AT LEAST ONE OF I) INDIVIDUAL ONES OF THE NVME/TCP PDUS BEING
│  INCLUDED IN SEPARATE CORRESPONDING TCP DATA SEGMENTS, ACCORDING TO
│  A HANDSHAKE PROTOCOL UTILIZED BY A SWITCH AND AN END POINT FOR
│  CONTROLLING PDU PACKAGING, OR II) A METADATA HEADER BEING RECEIVED IN
│  A TCP DATA SEGMENT, THE METADATA HEADER IDENTIFYING A TOTAL NUMBER
│  OF THE NVME/TCP PDUS, THE METADATA HEADER IDENTIFYING OFFSETS
│  ASSOCIATED WITH NVME/TCP PDUS DATA HEADERS. THE NVME/TCP PDUS
│  CAN BE INCLUDED IN A TCP PAYLOAD, WHICH CAN BE SEPARATED INTO TCP
│  DATA SEGMENTS, SUCH AS TCP SUB-SEGMENTS. THE METADATA HEADER CAN
│                 BE RECEIVED IN A METADATA PDU
│                             810
└─────────────────────────────────────────────────────────────┘
                               │
                               ▼
┌─────────────────────────────────────────────────────────────┐
│        STORE THE INFORMATION IN CONNECTION AND IO TABLES     │
│                             812                              │
└─────────────────────────────────────────────────────────────┘
                               │
                               ▼
┌─────────────────────────────────────────────────────────────┐
│  PROVIDE STORAGE I/O METRICS BASED ON THE INFORMATION STORED IN THE
│                    CONNECTION AND IO TABLES
│                             814
└─────────────────────────────────────────────────────────────┘
```

FIG. 8B

INTERNET PROTOCOL (IP) SWITCH-BASED ANALYTICS MANAGEMENT

TECHNICAL FIELD

The present disclosure relates generally to using Internet Protocol (IP) switches to manage storage area network (SAN) analytics.

BACKGROUND

Computing devices may utilize storage devices in Storage Area Networks (SANs) to store data. The SANs, such as Fiber Channel (FC) SANs, may be utilized to identify various types of analytics data associated with storage performance. The analytics data may be utilized to manage operation of the SANs, the storage devices, and/or various other devices associated with data storage. The analytics data identified utilizing the SANs may include various types of metrics, such as Input/Output (I/O) metrics. Various other types of networks, such as Internet Protocol (IP) SANS, may be utilized to manage storage devices for data storage.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 illustrates example tables utilized for NVMe-TCP PDU packaging.

FIGS. 8A and 8B illustrate flow diagrams of example processes for the devices in the SAN management distributed architecture as described in FIG. 1.

DESCRIPTION OF EXAMPLE EMBODIMENTS

Overview

Figure 1:
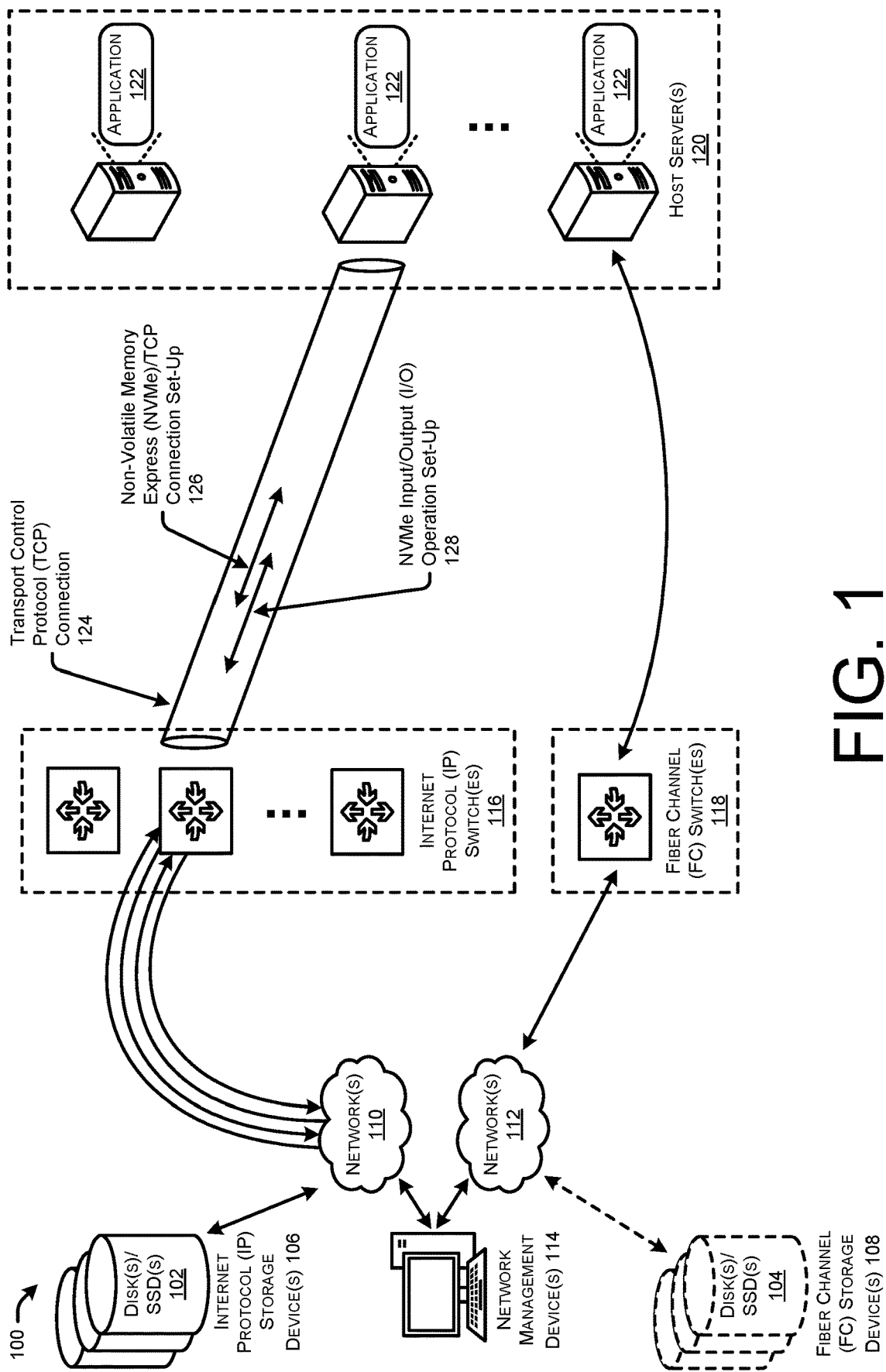
FIG. 1 illustrates an example environment including Internet Protocol (IP) switches to manage analytics in a Storage Area Network (SAN) management distributed architecture.

This disclosure describes various techniques for Internet Protocol (IP) switch-based Storage Area Networks (SANS) analytics management. An example method includes receiving at least one Transport Control Protocol (TCP) data segment. In some cases, the method further includes identifying storage Input/Output (I/O) metrics associated with Non-Volatile Memory express (NVMe)/TCP Protocol Data Units (PDUs), based on at least one of i) individual ones of the NVMe/TCP PDUs being included in separate corresponding TCP data segments, according to a handshake protocol utilized by a switch and an end point for controlling PDU packaging, or ii) a metadata header being received in a TCP data segment, the metadata header identifying a total number of the NVMe/TCP PDUs, the metadata header identifying offsets associated with NVMe/TCP PDUs data headers.

In some examples, the storage I/O metrics can be identified based on individual ones of the NVMe/TCP PDUs being included in the separate corresponding TCP data segments, according to the handshake protocol utilized by the switch and the end point for controlling the PDU packaging. In some cases, identifying the storage I/O metrics further comprises identifying the storage I/O metrics, based on the metadata header. In some instances, identifying the storage I/O metrics further comprises identifying the storage I/O metrics based on the metadata header being received in the TCP data segment.

In some examples, the method further includes storing, by a network switch and in an I/O table, a set of I/O transaction metrics associated with I/O transactions until completion of the I/O transactions, the I/O transactions being associated with delivery of the NVMe/TCP PDUs. In those or other examples, the method further includes causing, by the network switch and in a connection table, storage of a set of connection metrics associated with a set of transactions that comprise the I/O transactions.

According to various implementations, any of the example methods described herein can be performed by a processor. For example, a device or system may include the processor and memory storing instructions for performing an example method, wherein the processor executes the method. In some implementations, a non-transitory computer readable medium stores instructions for performing an example method.

EXAMPLE EMBODIMENTS

According to various techniques described in this disclosure, IP switches in SANs can be utilized to perform analytics management. The SANs can include NVMe/TCP capable IP SANs. The switches can be utilized to manage metrics associated with data storage performed via operation of the SANs. The metrics being collected can include various types of I/O metrics. The switches can be utilized to collect the metrics by analyzing content being routed by the switches. The content can include header content and data segments. The header content can include PDU header content and TCP/IP header content. The PDU header content can include NVMe/TCP PDU headers. The data segments can include TCP segments, and PDU segments within the TCP segments. The PDU segments can be included along with the PDU header content in PDUs defined for storage operations. The switches can be utilized to collect the metrics notwithstanding numbers of the PDU segments in I/O connections being greater than numbers of the TCP segments. The metrics being managed utilizing IP switches can be the same as any types of metrics capable of being collected otherwise by other types of switches, such as Fiber Channel (FC) switches, according to existing technology.

In various implementations, the switches can collect the metrics based on NVMe/TCP PDUs being packaged in TCP segments utilized to transport the NVMe/TCP PDUs according to different cases. According to a first case in which a size of an NVMe/TCP PDU is less than or equal to a threshold amount of data transportable by a single TCP segment, the NVMe/TCP PDU can be packaged and transported in a TCP segment. According to a second case in which a total size of two or more NVMe/TCP PDUs is less than or equal to a threshold amount of data transportable a single TCP segment, individual NVMe/TCP PDUs in a group of NVMe/TCP PDUs associated with a communication can be packaged and transported in separate corresponding TCP segments (e.g., based on handshaking between a switch and an end point (a storage device and/or a host), via a handshaking protocol. According to a third case in which a size of NVMe/TCP PDU is greater than a threshold amount of data transportable by a single NVMe/TCP PDU, individual portions of a single NVMe/TCP PDU can be packaged and transported in corresponding TCP segments in a group of TCP segments associated with a communication.

In additional or alternative implementations, NVMe/TCP PDUs can be transported utilizing metadata headers in TCP segments. As an example, individual metadata headers being generated and optionally inserted in corresponding TCP segments utilized to package the NVMe/TCP PDUs can include i) a total number of the NVMe/TCP PDUs being transported in a communication, and ii) one or more offsets associated with one or more respective NVMe/TCP PDUs being transported in the communication.

Implementations of the present disclosure solve specific problems in the field of computer networking. For example, SANs with FC switches are often utilized for data storage according to conventional technology based on the FC switches enabling metrics to be collected. In contrast, by enabling metrics associated with the IP switch-based SANs to be collected according to the techniques discussed herein, data storage can be performed by IP switch-based SANs at relatively greater levels of efficiency, reliability, and security. Operating the IP switch-based SANs according to the techniques discussed herein enables analytics management, such as that performed via operation of existing FC switch-based SANs, to be performed via operation of the IP switch-based SANs. Performing the analytics management for the IP switch-based SANs according to the techniques discussed herein enables data storage to be performed utilizing the relatively more sophisticated operations of the IP switch-based SANs. For example, the IP switch-based SANs, which have enterprise level auto-discovery, security, and authentication features that are equivalent to features of FC switch-based networks, can be utilized for data storage by performing analytics management for the IP switch-based SANs according to the techniques discussed herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like reference numerals present like parts and assemblies throughout the several views.

FIG. 1 illustrates an example environment 100 including Internet Protocol (IP) switches to manage analytics in a Storage Area Network (SAN) management architecture. The SAN management architecture may be utilized to manage one or more SANs of various types. The SAN(s) may include one or more Internet Protocol (IP) SANS, such as one or more Non-Volatile Memory express (NVMe)/Transmission Control Protocol (TCP) capable IP SANS. The SAN(s) may, possibly, include one or more Fiber Channel (FC) SANs. The NVMe/TCP capable IP SANs may be utilized to perform analytics management in a similar way as any types of analytics management of which the FC SAN(s) may be capable of performing.

Generally, the SAN management architecture may include devices housed or located in one or more data centers that may be located at different physical locations. The data center(s) may be included in a computing system, such as a distributed computing system. For instance, the SAN management architecture may be supported by networks of devices in a public cloud computing platform, a private/enterprise computing platform, and/or any combination thereof. The one or more data centers may be physical facilities or buildings located across geographic areas and designated to store networked devices that are part of the SAN management architecture. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth) resources. However, in some examples the devices in the SAN management architecture may not be located in explicitly defined data centers but may be located in other locations or buildings.

The SAN management architecture may be include, and/or be accessible to, various types of storage media, such as one or more disks/solid state drives 102(*i*), 102(*ii*), . . . 102(*x*) (collectively referred to herein as "disk(s)/SSD(s) 102") and one or more disks/solid state drives 104(*i*), 104(*ii*), . . . 104(*x*) (collectively referred to herein as "disk(s)/SSD(s) 104"). In various examples, individual ones of disk(s)/SSD(s) 102/104 can represent any other type of storage media. The disk(s)/SSD(s) 102 may include one or more Internet Protocol (IP) storage devices 106. The disk(s)/SSD(s) 102 may include one or more FC storage devices 108. In some examples, the SAN management architecture may be accessible to the disk(s)/SSD(s) 102 over one or more networks 110. For instance, the one or more network(s) 110 may include one or more IP networks. In some examples, the SAN management architecture may be accessible to the disk(s)/SSD(s) 104 over one or more networks 112. For instance, the one or more network(s) 112 may include one or more FC networks.

In various examples, the network(s) 110 (e.g., a data network for the IP switch(es) 116, as discussed below in further detail) may be separate from, and/or disjointed with respect to, the network(s) 112 (e.g., a data network for the FC switch(es) 118, as discussed below in further detail). In those or other examples, one or more management networks can be utilized to manage the network(s) 110 and/or the network(s) 112. For instance, the management network(s) utilize to manage the network(s) 110 can include, be the same as, and/or be integrated with the management network(s) 112 utilized to manage the network(s) 112. In such an instance, a management network through which all the IP and FC switches 116/118 only are connected, can be utilized to manage the IP and FC switches 116/118.

The SAN management architecture and/or the network(s) 110 may each respectively include one or more networks implemented by any viable communication technology, such as wired and/or wireless modalities and/or technologies. The SAN management architecture and/or the network(s) 110 may include any combination of Personal Area Networks (PANs), Local Area Networks (LANs), Campus Area networks (CANs), metropolitan Area Networks (MANs), extranets, intranets, the Internet, short-range wireless communication networks (e.g., ZigBee, Bluetooth, etc.), Wide Area Networks (WANs)—both centralized and/or distributed—and/or any combination, permutation, and/or aggregation thereof. The SAN management architecture may include devices, virtual resources, or other nodes that relay packets from one network segment to another by nodes in the computer network.

In some examples, the SAN management architecture may provide, host, or otherwise support one or more application services for one or more network management devices 114 to connect to and use. For example, the network management device(s) 114 can include a network management station. Individual network management device(s) 114 may comprise any type of device configured to communicate using various communication protocols (e.g., multipath TCP (MCTCP), quick user datagram protocol (UDP) Internet connections (QUIC), and/or any other protocol) over the network(s) 110 and/or the network(s) 112. For instance, any of the network management device(s) 114 may comprise a network device (e.g., servers, routers, switches, access points, etc.). For instance, any of the network management device(s) 114 may include a personal user device (e.g., desktop computers, laptop computers, phones, tablets, wearable devices, entertainment devices such as televisions, etc.). Although the application service(s) for the network management device(s) 114 may be supported as discussed above by the SAN management architecture, this disclosure is not limited as such and application service(s) for any other type of computing device may be supported by the SAN management architecture.

The SAN management architecture may be include one or more IP switches 116 and, possibly, one or more FC switches 118. In some examples, the IP switch(es) 116 may be utilized to provide accessibility to the IP storage device(s) 106. In those or other examples, the FC switch(es) 118 may be utilized to provide accessibility to the FC storage device(s) 108.

The SAN architecture may include one or more host servers (also referred to herein as "host(s)" or "server(s)") 120. The application service(s) may be one or more distributed applications 122. Groups of the host(s) 120 may be configured to scale up or down to support instances of any application to service one or more computing requests.

The IP switch(es) 116 may be utilized to perform analytics management, including management of one or more metrics. The analytics management may be performed utilizing one or more communications (e.g., transport and/or delivery of one or more files, one or more frames, one or more packets, one or more segments, one or more bits, etc., or any combination thereof) (or "message(s)") of various types. The communication(s) may be exchanged utilizing one or more connections, such as a TCP connection (e.g., an NVMe/TCP connection) 124, an NVMe/TCP connection set-up (e.g., an NVMe/TCP communications set-up) 126 and an NVMe I/O operation set-up 128. For example, the TCP connection 124 may be established between the host(s) 120 and the IP storage device(s) 106. Initial setup of the TCP connection 124 can be established between individual ones of the host(s) 120 and a storage controller (e.g., the NVMe storage controller 204/304, as described below with respect to FIGS. 2 and 3), and the Read/Write I/O Operations, using one or more PDUs (e.g., a Command Request PDU (e.g., I/O begin) followed by one or more DATA PDUs and finally a Response PDU (e.g., I/O end). The TCP connection 124 can be established, in various cases, based on a TCP synchronization, a TCP synchronization acknowledgement, an NVMe-TCP initial connection (IC) request PDU, an NVMe-TCP IC response PDU, an NVMe-over fabric (NVMe/oF) connect request, an NVMe-oF connect response, and/or one or more NVMe I/O Operations (e.g., one or more Read Operations and/or one or more Write Operations).

The TCP connection 124 can be utilized to perform management of the metric(s) based on one or more Protocol Data Units (PDUs) transported via the NVMe I/O Operations (also referred to herein simply as "Operation(s)") (e.g., the Read/Write Operations)). In some examples, the Operation(s) can be utilized to transport the PDU(s) based on the TCP connection 124 being established. In those or other examples, the Operation(s) can be utilized to transport the PDU(s) based on the NVMe/TCP connection set-up 126

In various implementations, the communication(s) can include, as one or more NVMe I/O operations, one or more PDU operations associated with transporting of the PDUs, and one or more TCP operations associated with transporting of the TCP segments. The NVMe I/O operation(s) can be the same as, or different from, the TCP operation(s). The NVMe I/O operation(s) can include delivery of one or more NVMe/TCP I/O data PDUs (e.g., one or more NVMe/TCP read data PDUs, one or more NVMe/TCP write data PDUs, etc., or any combination thereof). Individual ones of, and/or combinations of, the NVMe/TCP I/O operation data PDU(s) (also referred to herein simply as "data PDU(s)"), can be transported in at least one of the TCP segment(s). In various examples, the data PDU(s) can include storage data, such as data to be utilized for the Read Operation(s) and/or the Write Operation(s).

Various combinations of various numbers of the PDU(s) and various numbers of the TCP segment(s) can be transported via the TCP operation(s). In some examples, according to one case (e.g., the first case) (or "Case-A"), a single PDU associated with a TCP connection (e.g., the TCP connection 124) can be transported in a single TCP segment. In those or other examples, according to one case (e.g., the second case) (or "Case-B"), groups of two or more of the PDU(s) associated with a TCP connection (e.g., the TCP connection 124) can be transported in individual TCP segment(s) based on handshaking between an IP switch 116 and an end point (e.g., an IP storage device 106 or a host 120). In those or other examples, according to one case (e.g., the third case) (or "Case-C"), a single PDU associated with a TCP connection (e.g., the TCP connection 124) can be split (e.g., divided) and transported in two or more TCP segments.

According to the Case-B, for instance, individual TCP segment(s) can be split (e.g., subdivided) into two or more TCP sub-segments based on the handshaking. Individual ones of the two or more TCP sub-segments can be utilized to transport the corresponding PDU(s) in the group of PDUs.

In alternative or additional examples, for instance with any of the Case-A-Case-C, and/or with or without the handshaking, individual TCP segment(s) can include one metadata PDU carrying metadata about the groups of PDU(s) in the TCP segment. For instance, a single metadata PDU can be included in the TCP segment. The single metadata PDU, if present in the TCP segment, can be included as a first PDU in the TCP segment. For instance, the metadata PDU can be included at a front of the TCP segment (e.g., before any other PDUs of any type in the TCP segment). The metadata can include PDU number data indicating how many PDUs are in PDU(s) (e.g., in a group of PDU(s)) present in TCP segment. Alternatively or additionally, the metadata can include begin offset data indicating one or more offset(s) of PDUs in the group of PDUs in the TCP segment.

One or more metrics can be collected by the network management device(s) 114. The metric(s) can be collected utilizing various switches, such as the IP switch(es) 116. The metric(s) can be collected based on the PDU(s) being transmitted, in the TCP segment(s). The metric(s) can be collected utilizing the metadata and/or the TCP sub-segments. By utilizing the metadata and/or the TCP sub-segments to transmit the PDU(s) in the TCP segment(s), the switch(es) 116 can be utilized to collect the same types of metrics that would otherwise be available via the FC switch (es) 118.

Figure 2:
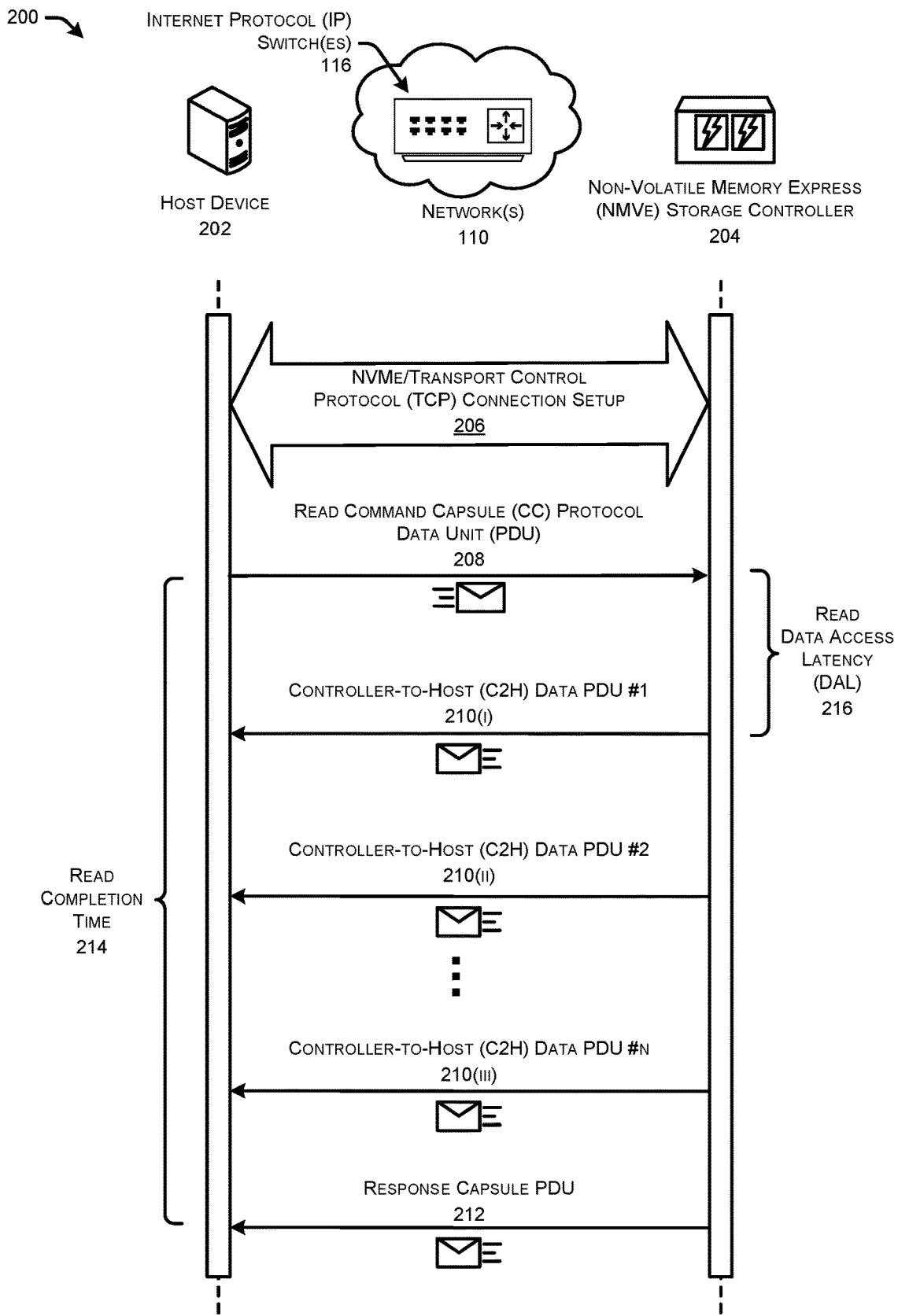
FIG. 2 illustrates a flow diagram of example communications for Non-Volatile Memory express (NVMe) read operation-oriented and Internet Protocol (IP) switch-based analytics management.

FIG. 2 illustrates a flow diagram of example communications 200 for NVMe read operation-oriented and IP switch-based analytics management. The analytics management can be performed utilizing one or more data PDUs associated with one or more NVMe I/O Operations, such as one or more Read Operations.

In various implementations, the analytics management can be performed utilizing one or more switches (e.g., the IP switch(es) 116, as discussed above with reference to FIG. 1). The Read Operation(s) can be routed via the IP switch(es) 116 between a host device 202 and an NVMe storage controller 204 (e.g., a server including the NVMe storage controller 204). In some examples, the host device 202 can be utilized to implement any of the host server(s) 120, as discussed above with reference to FIG. 1. The Read Operation(s) can be routed via one or more networks, such as the network(s) 112, as discussed above with reference to FIG. 1.

The various types of NVMe read operations transported based on the NVMe/TCP connection setup 206 (e.g., based on completion of the NVMe/TCP connection setup 206) can include a read command capsule (CC) PDU 208, one or more controller-to-host (C2H) data PDUs #1-#n 210(*i*)-210 (*iii*) (collectively referred to herein as "C2H data PDU(s) 210"), and a response capsule PDU 212. The Read CC PDU 208 can be transmitted by the host device 202 and to the NVMe storage controller 204, and via the IP switch(es) 116. The one or more C2H data PDU(s) 210 can be transmitted by the NVMe storage controller 204 and to the host device 202, and via the IP switch(es) 116. The response capsule PDU 212 can be transmitted by the host device 202 and to the NVMe storage controller 204, and via the IP switch(es) 116.

The C2H data PDU(s) 210 can be transmitted in a TCP segment (or "TCP payload"). The TCP segment can include one metadata PDU carrying metadata about the C2H data PDU(s) 210, respectively. The metadata PDU can include a metadata header and a metadata PDU segment (or "metadata PDU payload").

Alternatively, the TCP segment can be split (e.g., subdivided) into two or more TCP sub-segments. The two or more TCP sub-segments can be utilized to transport a group of PDUs, which can include two or more C2H data PDUs 210, respectively. For example, individual TCP sub-segments can include an C2H data PDU 210 from among the group.

In some examples, the analytics management can include managing (e.g., identifying, determining, collecting, gathering, modifying, adding, deleting, distributing, etc., or any combination hereof), by the switch(es) 116, one or more metrics. The metric(s) can be identified, based on the PDU(s) being transmitted in the TCP segment(s). Additionally or alternatively, the metric(s) can be identified based on the metadata and/or the TCP sub-segments being utilized for delivery of the C2H data PDU(s) 210.

The metric(s) can include a read completion time 214. The read completion time 214 can include a time between delivery (e.g., completion of delivery) of the Read CC PDU 208 and delivery (e.g., completion of delivery) of the response capsule PDU 212. The read completion time 214 can include a value representing a time difference between when a read command is transmitted (e.g., when the Read CC PDU 208 is transmitted) and when a status is returned (e.g., when the response capsule PDU 212 is returned) to the host device 202.

The metric(s) can include a Read Data Access Latency (DAL) 216. The Read DAL 216 can include a time between delivery (e.g., completion of delivery) of the CC PDU 208 and delivery (e.g., completion of delivery) of a first data PDU (e.g., the C2H data PDU #1 210(*i*).

Figure 3:
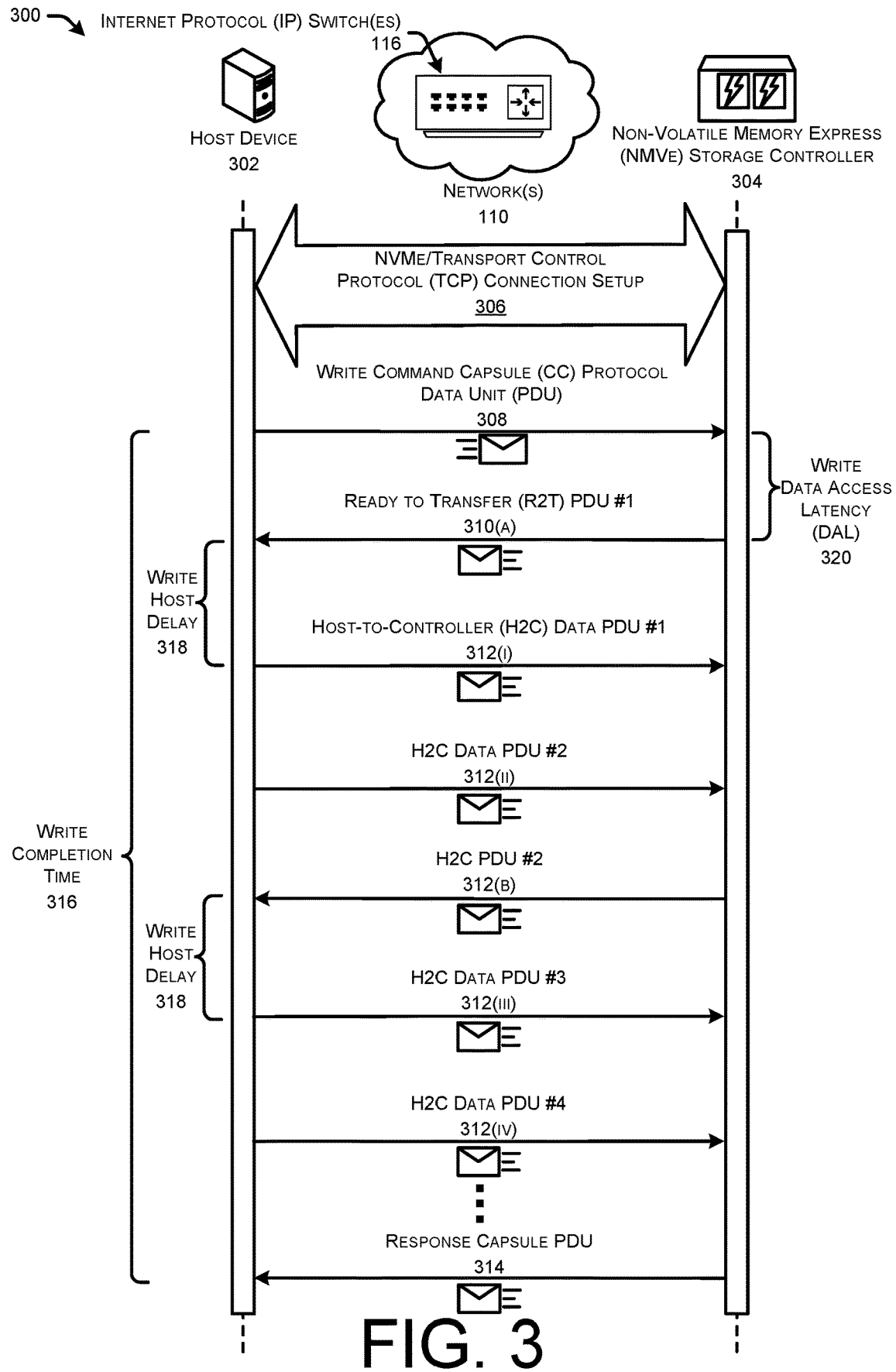
FIG. 3 illustrates a flow diagram of example communications for NVMe write operation-oriented and IP switch-based analytics management.

FIG. 3 illustrates a flow diagram of example communications 300 for NVMe write operation-oriented and IP switch-based analytics management. The analytics management can be performed utilizing one or more data PDUs associated with one or more NVMe I/O Operations, such as one or more Write Operations.

In various implementations, the analytics management can be performed utilizing one or more switches (e.g., the IP switch(es) 116, as discussed above with reference to FIG. 1). The Write Operation(s) can be routed via the IP switch(es) 116 between a host device 302 and an NVMe storage controller 304 (e.g., a server including the NVMe storage controller 304). In some examples, the host device 302 can be utilized to implement any of the host server(s) 120 and/or the host device 202, as discussed above with reference to FIGS. 1 and 2. In some examples, the NVMe storage controller 304 and the NVMe storage controller 204, as discussed above with reference to FIG. 2, can be implemented separately from one another, or as the same NVMe storage controller. The Write Operation(s) can be routed via one or more networks, such as the network(s) 112, as discussed above with reference to FIG. 1.

The Write Operation(s) (e.g., one or more NVMe Write Operations) can include an NVMe/Transport Control Protocol (TCP) connection setup 306. The NVMe/TCP connection setup 306 can include one or more NVMe/TCP connection setup operations (e.g., any of the operation(s) of the NVMe/TCP connection setup 206, as discussed above with reference to FIG. 2).

The various types of NVMe write operations transported based on the NVMe/TCP connection setup 306 (e.g., based on completion of the NVMe/TCP connection setup 306) can include a Write Command Capsule (CC) PDU 308, one or more ready to transfer (R2T) PDUs #1, #2, etc., 310(*a*) and 310(*b*), etc., one or more Host-to-Controller (H2C) data PDUs #1-#4 312(*i*)-312(*iv*) (collectively referred to herein as "H2C data PDU(s) 312"), and a response capsule PDU 314. The Write CC PDU 308 can be transmitted by the NVMe storage controller 204 and to the host device 202, and via the IP switch(es) 116. The one or more H2C data PDUs 312(s) can be transmitted by the host device 202 and to the NVMe storage controller 204, and via the IP switch(es) 116. The response capsule PDU 314 can be transmitted by the NVMe storage controller 204 and to the host device 202, and via the IP switch(es) 116.

The H2C data PDU(s) 312 can be transmitted in a TCP segment (or "TCP payload"). The TCP segment can include one metadata PDU carrying metadata about the H2C data PDU(s) 312, respectively. The metadata PDU can include a metadata header and a metadata PDU segment (or "metadata PDU payload").

Alternatively or additionally to utilizing the metadata PDU, the TCP segment can be split (e.g., subdivided) into two or more TCP sub-segments. The two or more TCP sub-segments can be utilized to transport a group of PDUs, which can include two or more H2C data PDUs 312, respectively. For example, individual TCP sub-segments can include an H2C data PDU 312 from among the group.

In some examples, the analytics management can include managing (e.g., identifying, determining, collecting, gathering, modifying, adding, deleting, distributing, etc., or any combination hereof), by the switch(es) 116, one or more metrics. The metric(s) can be identified, based on the PDU(s) being transmitted in the TCP segment(s). Additionally or alternatively, the metric(s) can be identified based on the metadata and/or the TCP sub-segments being utilized for delivery of the H2C data PDU(s) 312.

The metric(s) can include a write completion time 316. The write completion time 316 can include a time between delivery (e.g., completion of delivery) of the Write CC PDU 308 and delivery (e.g., completion of delivery) of the response capsule PDU 314. The write completion time 316 can include a value representing a time difference between when a write command is transmitted (e.g., when the Write CC PDU 308 is transmitted) and when a status is returned (e.g., when the response capsule PDU 314 is returned) to the host device 302.

The metric(s) can include a write host delay 318. The write host delay 318 can include a time that includes a sum of time between delivery (e.g., completion of delivery) of individual R2T PDUs #1 and #2 310(a) and 310(b), and delivery (e.g., completion of delivery) of corresponding first data PDUs (e.g., the H2C data PDU #1 and #3 312(i) and 312(iii)), respectively. For example, the write host delay 318 can include a time that includes a sum of a time between delivery of the R2T PDU #1 310(a) and delivery of the H2C data PDU #1 312(i), and a time between delivery of the R2T PDU #2 310(b) and delivery of the H2C data PDU #3 312(iii).

The metric(s) can include a Write DAL 320. The Write DAL 320 can include a time between delivery (e.g., completion of delivery) of the Write CC PDU 308 and delivery (e.g., completion of delivery) of a first data PDU (e.g., the H2C data PDU #1 312(i).

Figure 4A:
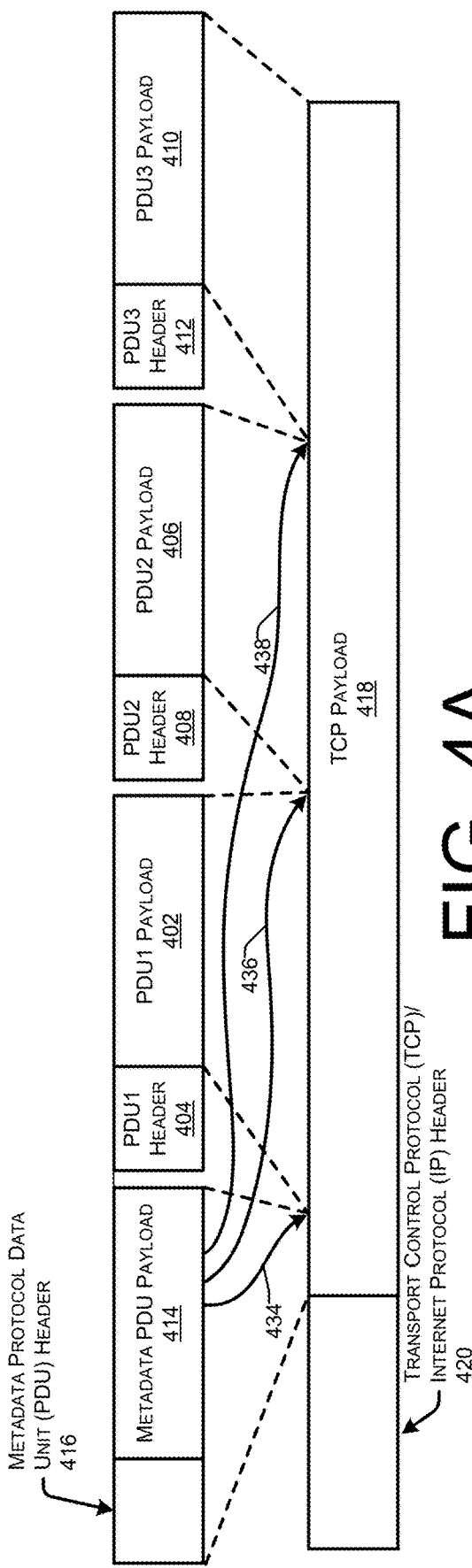
FIGS. 4A and 4B illustrate example NVMe-Transport Control Protocol (TCP) Protocol Data Unit (PDU) packaging with metadata PDUs for NVMe I/O operation-oriented and example IP switch-based analytics management.
Figure 4B:
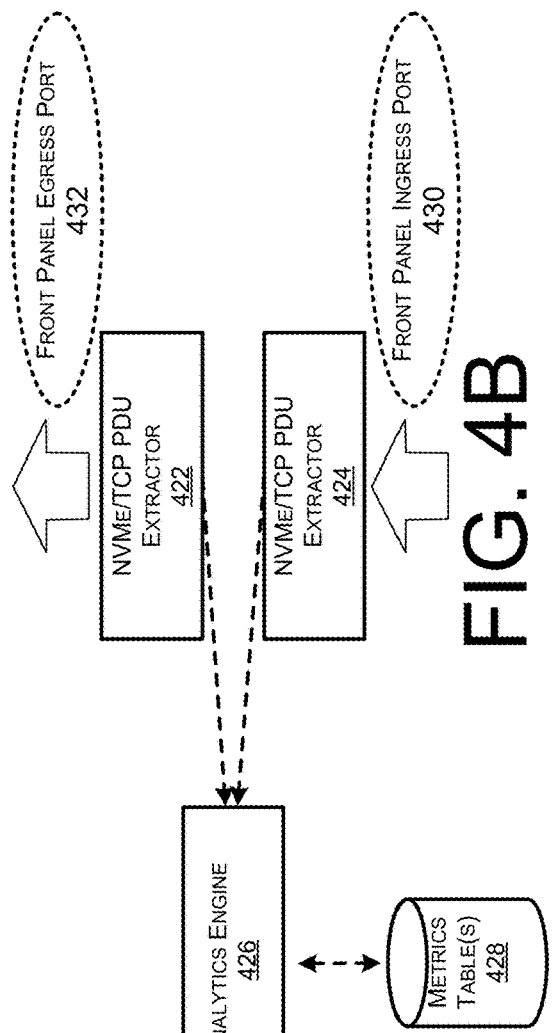

FIGS. 4A and 4B illustrate example NVMe-TCP PDU management with metadata PDUs for NVMe I/O operation-oriented and example IP switch-based analytics management. Referring to FIG. 4A, the NVMe-TCP PDU management can include packaging, such as IP switch-based packaging. The packaging can include one or more PDUs (e.g., one or more data PDUs), which can be utilized to transport data. In some cases, the PDU(s) can include the C2H data PDU(s) 210 and/or the H2C data PDU(s) 312, as discussed above with reference to FIGS. 2 and 3.

The PDU(s) can include various PDUs, such as PDU1, PDU2, and PDU3. Individual ones of the PDU(s) can include a PDU payload and PDU header data. The PDU header data can include various types of data, such as a PDU type, PDU type flags, a PDU length, a PDU data offset, a total number of PDU bytes, or any combination thereof.

By way of example, the PDU payload(s) can include a PDU1 payload 402 in the PDU1. The PDU1 payload 402 can be transmitted along with PDU1 header data. The header data in the PDU1 can include a PDU1 header 404. In such an example or another example, the PDU payload(s) can include a PDU2 payload 406 in the PDU2. The PDU2 payload 406 can be transmitted along with PDU2 header data. The PDU2 header data can include a PDU2 header 408. In such an example or another example, the PDU payload(s) can include a PDU3 payload 410 in the PDU3. The PDU3 payload 410 can be transmitted along with PDU3 header data. The PDU3 header data in the PDU3 can include a PDU3 header 412.

The metadata PDU can include one or more metadata PDU payloads; and metadata PDU header data, with one or more metadata PDU headers. The metadata PDU can be a different type than, and separate from, the data PDUs. By way of example, the metadata PDU payload(s) can include the PDU1 payload 402, which can be transmitted along with PDU1 header data. The PDU1 header data can include a PDU1 header 404.

The metadata PDU can include various types of information. The metadata PDU can be a variable length NVMe/TCP PDU (e.g., a new opcode) that carries metadata information about other PDUs (e.g., the PDU1, PDU2, and PDU3) following the metadata PDU (e.g., in a TCP segment, such as the TCP payload 418, as discussed below in further detail). The metadata PDU shall always be the first PDU (e.g., an initial PDU) in the TCP segment. The metadata PDU can include PDU number information identifying how many PDUs (e.g., three PDUs) are present in the TCP segment. The metadata PDU can include one or more begin offsets for all the non-first NVMe/TCP PDUs. For example, the metadata PDU can include a begin offset 434 for the PDU1 (e.g., a location in the TCP segment and of a start of the PDU1 payload), a begin offset 436 for the PDU2 (e.g., a location in the TCP segment and of a start of the PDU2 payload), and a begin offset 438 for the PDU3 (e.g., a location in the TCP segment and of a start of the PDU3 payload).

The metadata PDU can include, in various locations, the information utilized to identify the PDUs (e.g., the PDU1, PDU2, and PDU3). In various examples, the PDU1, PDU2, and PDU3 may be associated with an I/O connection (e.g., a single I/O communication, or "I/O connection"), such as an I/O communication for data storage. In some examples, the information utilized to identify the PDUs (e.g., the PDU1, PDU2, and PDU3), such as the PDU number information and/or the begin offset(s) 434-438, can be included in the metadata PDU payload (e.g., metadata segment) 414. In those or other examples, the metadata PDU can include, in the metadata PDU header 416, information utilized to identify the metadata PDU payload 414. The metadata PDU may be a different type of PDU from the data PDU(s) (e.g., the PDU(s) including the PDU payloads 402, 406, and 410)

In various examples, hardware in one or more switches (e.g., the IP switch(es) 116) can be utilized to identify the PDUs in the TCP segment utilizing the metadata PDU. For example, the IP switch(es) 116 can include hardware, such as programmable hardware (Application-Specific Integrated Circuits (ASICs), Field Programmable Gate Arrays (FPGAs), Data Processing Units (DPUs), etc.). The hardware can operate utilizing various logic (e.g., domain specific programming language and/or logic), such as switch ASIC P4 logic. The logic utilized to operate the hardware in the IP switch(es) 116 can be utilized for controlling packet forwarding planes in networking devices.

The logic utilized to operate the hardware in the IP switch(es) 116 can be utilized for the analytics management. For example, the logic utilized to operate the hardware in the IP switch(es) 116 can be utilized to perform managing of one or more metrics (or "storage I/O metric(s)") associated with storage data being processed by one or more devices (e.g., the IP storage device(s) 106, the network management device(s) 114, the IP switch(es) 116, the host server(s) 120, etc., or any combination thereof). The logic can be utilized by a User Defined Function (UDF) (e.g., a UDF in an IP switch 116) to identify (e.g., parse) and extract PDU headers (e.g., the PDU1 header 404, the PDU2 header 408, the PDU3 header 412) at each of the offsets 434-438.

In some examples, the logic can be utilized by the UDF, which is executed by the IP switch 116, to parse and extract the PDU headers 404/408/412. In those or other examples, the logic can be utilized by the UDF to parse and extract the PDUs based on the PDU headers 404/408/412. The PDUs can include the PDU payloads 402, 406, 410, respectively, and the PDU headers 404/408/412, respectively.

The number of PDUs in the TCP segment may be restricted by capabilities of UDFs. For example, due to limitations on the number of locations that may parsed by a UDF, the number of PDUs (e.g., 16 or 32 PDUs) being packed into a TCP segment may be limited to the number of locations (e.g., 16 or 32 locations), respectively, to which parsing by the UDF is restricted.

In various examples, the PDU(s) (e.g., the PDU1, PDU2, and PDU3) can be transported utilizing a TCP payload 418. The TCP payload 418 can be transported along with TCP/IP header data, which can include a TCP/IP header 420.

Referring to FIG. 4B, the logic in the IP switch(es) 116 can include various types of logic utilized for various purposes. In some examples, the logic in the IP switch(es) 116 can include one or more NVMe/TCP PDU extractors (e.g., one or more UDFs), such as a P4 program. The extractor(s) can include, for example, an NVMe/TCP PDU extractor 422 and an NVMe/TCP PDU extractor 424. The NVMe/TCP PDU extractor 422 and the NVMe/TCP PDU extractor 424 can be included in individual ones of the IP switch(es) 116. The logic can include a P4 program (e.g., the NVMe/TCP PDU extractor(s) 422/424) on individual IP switch(es) 116. The P4 program can be utilized by an IP switch 116, which may be a programmable IP switch. The logic can run on one or more analytics enabled ASIC ports of the IP switch 116. The extractor can examine traffic matching TCP segments of interest (e.g., a source/destination port, or "Src/Dest Port" at 4420: NVMe/TCP) in both ingress and egress directions of a port inline with the traffic. For example, the extractor can examine traffic matching TCP segments of interest in a direction of data ingress via a front panel ingress port 430 (e.g., a port at which the PDUs enter the IP switch 116), as represented by an arrow illustrated in FIG. 4B, and a direction of data egress via a front panel egress port 432 (e.g., a port at which the PDUs exit the IP switch 116), as represented by an arrow illustrated in FIG. 4B. Analytics may be enabled on individual host/storage connected edge switch port(s), the port(s) being corresponding point(s) of entry and exit of I/O request and response PDUs (e.g., the PDUs, such as the PDU1, the PDU2, the PDU3, etc.).

As individual PDU extractor(s) 422/424 start to identify TCP segments, the PDU extractor 422/424 can identify and extract one or more PDU headers, such as the PDU headers 404, 408, and 412 and NVMe header(s)) from the TCP segments. The PDU header(s) can be sent to an analytics engine 426, which may be a P4 analytics engine. In various examples, the analytics engine 426 can be implemented utilizing, and/or be implemented within, the IP switch 116. The analytics engine 426 can analyze and/or intercept data (e.g., any of the PDUs of any type) being transported between the NVMe/TCP PDU extractor 422 and the NVMe/TCP PDU extractor 424. The IP switch 116 can later export data (e.g., analytics engine data) identified by the IP switch 116, to the network management device(s) 114.

Individual PDU extractor(s) 422/424 can identify an IPV4 header total length field, which can be used to determine the TCP segment begin and end locations (e.g., locations of a begin and an end of the TCP payload 418, which can be determined after subtracting a TCP header length associated with the TCP/IP header 420). Based on an offset zero of the TCP payload 418, a first NVMe/TCP PDU (e.g., the PDU1) can be parsed and extracted. The PDU header 416 may include a PDU-Type, a PDU header length (HLEN), and a PDU length (PLEN) associated with the PDU1.

In various examples, TCP payloads associated with various cases (e.g., Case-A, Case-B, and Case-C, as discussed below with reference to FIGS. 5A-5C). Individual PDU extractor(s) 422/424 can identify if a number of bytes remaining equals zero (e.g., Bytes Remaining=0) and if a length of a PDU is the same as a length of a TCP payload (e.g., PLEN=TCP Segment Length). The PDU extractor 422/424 can identify a PDU as being in Case-A, based on the number of bytes remaining being equal to zero, and the length of the PDU being the same as the length of the TCP payload.

In various cases, individual PDU extractor(s) 422/424 can maintain a bytes remaining field per-TCPConnection, and per-direction, to track PDUs that span TCP segments (e.g., other TCP segments in Case-C, as discussed below with reference to FIG. 5C). The PDU can start at an offset zero and extract the offset zero if a number of bytes (e.g., being tracked by individual PDU extractor(s) 422/424) is zero (e.g., Bytes Remaining=0) and a length of a PDU is greater than a length of a TCP payload (e.g., PLEN>TCP Segment Length), to identify the PDU as being in Case-C. For example, the PDU may be the first segment with the PDU header starting at offset zero. The number of bytes remaining can be updated to be a length of a PDU less a length of a TCP segment (e.g., Bytes Remaining=(PLEN-TCP Segment Length). The PDU at offset zero can be extracted.

If a number of bytes remaining is greater than zero (Bytes Remaining>0), the PDU may be in Case-C and a continuation of a previously seen PDU (e.g., a continuation of a PDU payload). The number of bytes remaining can be updated to be a length of a PDU less a length of a TCP segment (e.g., Bytes Remaining=(PLEN-TCP Segment Length)). As new segments (e.g., PDUs) are received on a TCP connection and direction, individual PDU extractor(s) 422/424 can update the number of bytes until an end of an entire PDU (e.g., an entire PDU with all PDUs in Case-C) is reached, based on number of bytes remaining being equal to zero (e.g., Bytes Remaining=0). There is no PDU to be extracted based on the number of bytes remaining being equal to zero.

If a number of bytes remaining equals zero and a length of a PDU is less than a length of a TCP segment (e.g., Bytes Remaining=0) and (PLEN<TCP segment length), the PDU may be identified as being in Case-B. In contrast to existing systems that ignore the segment, the metadata PDU can be utilized to handle the PDU for Case-B. One or more UDFs can be utilized to extract PDU headers (e.g., PDU1 header 404, PDU2 header 408, and PDU3 header 412) embedded in the TCP payload 418. For TCP segments encapsulated in IPV6 datagrams, equivalent fields are extracted from the IPV6 header.

The analytics engine 426 can be utilized to manage the metric(s), which can be stored in one or more metrics tables 428. For example, the metrics table(s) 428 can include table 1 (e.g., the connection table 700), and table 2 (e.g., the IO table 702), as discussed below with reference to FIG. 7.

The analytics engine 426 can be utilized to manage the PDU(s). A request or response, such as an ICReq/Resp communication associated with a PDU with a non-zero command ID, can be utilized to create an entry in the connection table 700. For example, the request/response can include an initialize connection request (e.g., an H2C request) (e.g., the Read Command Capsule (CC) PDU 208, as discussed above with reference to FIG. 2) or an initialize connection response (e.g., a C2H response) (e.g., the Write CC PDU 308, as discussed above with reference to FIG. 3). A terminate connection PDU can be utilized to remove the corresponding entry from the IO table 702.

The analytics engine 426 can, if a command PDU (e.g., a Read/Write PDU) (e.g., the Read CC PDU 208, the Write CC PDU 308, etc.) is received, utilize a connection table key tuple and a namespace ID from an NVMe header (e.g., an NVMe header of the PDU) to look up a corresponding entry in the connection table 700 and in the IO table 702. For every new tuple and command ID being received in the command PDU, an entry is created in the IO Table 702 can be created with a timestamp indicating a new I/O (or "I/O Operation") is beginning. In some examples, a missing entry in the connection table 700, or an already existing entry in the IO Table 702, maybe indicative of an error condition.

A total outstanding count can be incremented in the IO Table 702 for a command PDU and the Begin Timestamp can be noted, based on the command PDU being received. One or more metrics (e.g., a TotalIOCount metric, a Total-InterIOGap metric, a MinInterIOGap metric, etc., or any combination thereof) can be updated in the connection table 700 for a Read/Write Operation being completed. The metric(s) (e.g., the accumulated total counts identified by the TotalIOCount metric) may help in computing averages, such as an average read completion time per I/O Operation.

A ready to transfer PDU #1 (e.g., the R2T PDU #1 310(A), as discussed above with reference to FIG. 3) can be used to update one or more metrics (e.g., a total DAL metric, a max DAL metric for a Write I/O Operation, etc., or any combination thereof). A first C2H data PDU (e.g., the C2H data PDU #1 210(i)) can be used to update a total/max DAL metric for a Read I/O Operation, and to compute a total I/O operation size metric and/or a minimum/maximum I/O size metric (e.g., using a data PDU length (PLEN) less a data offset (PDO) field. A first H2C data PDU (e.g., the H2C data PDU #1 312(i)) can be used to update a total host delay metric (e.g., the write host delay 318) associated with a Write Operation. Intermediate H2C/C2H data PDUs (e.g., the C2H data PDU #2 or #3 210(ii) or 210(iii)) (e.g., the H2C data PDU #312(i))) that could be continuation of a previously examined data PDU may be ignored with respect the analytics management (e.g., if they are not capable of being utilized to obtain metrics of interest).

If a response PDU (e.g., the response capsule PDU 212, as discussed above with reference to FIG. 2) (e.g., response capsule PDU 314, as discussed above with reference to FIG. 3) is received and if a code associated with the response PDU is a success code, the response PDU can be used to compute an I/O completion time metric (e.g., the read completion time 214, as discussed above with reference to FIG. 2) (e.g., the write completion time 316, as discussed above with reference to FIG. 3). The I/O completion time metric can be computed using a beginning time metric. The beginning time metric may identify a beginning of an I/O Operation that is saved in the IO Table 702. The I/O completion time metric can be updated in the connection table 700 based on the response PDU. If the code associated with the response PDU is an error code, a corresponding error counter can be extracted from the NVMe header and incremented. The IO Table entry can be deleted based on the code being the success code or the error code. A timer can be started for each command PDU added to the IO Table 702 to identify requests that time out based on response PDUs not being received in time. For example, requests may time out based on a time difference between a time at which the command PDU is received and a current time being greater than a time difference threshold.

In various cases, the PDUs can be identify via "non-sampled" examination of packets by the IP switch 116 to extract the storage I/O metrics. For example, the storage I/O metrics can be extracted at "line rate."

In various cases, the IP switch 116 can deduce storage I/O metrics from NVMe/TCP SAN traffic. For example, the NVMe/TCP SAN traffic can include NVMe/TCP PDUs being transported in i) the single TCP segment that includes metadata header, or ii) corresponding TCP segments based on the handshaking protocol. The NVMe/TCP SAN traffic may transit the IP switches 116 independent of host/storage vendor.

In various cases, the IP switch 116 can (e.g., by utilizing the UDF) parse and extract the NVMe/TCP PDUs that are embedded inside TCP segments of packets via deep packet inspection (DPI). The IP switch 116 can perform the parsing and extracting, by using programmable pipelines of the switching ASIC in the IP switch 116.

In various cases, the IP switch 116 can correlate the NVMe/TCP PDUs identified (or "seen") on ingress and egress edge-ports of the IP switch 116. The IP switch 116 can compute the storage I/O metrics in a data path (e.g., an ASIC data path) associated with transport of the NVMe/TCP SAN traffic. The IP switch 116 can use the analytics engine 426, which can be an on-chip analytics engine, without sampling and/or adding additional latency to the ASIC data path.

In various cases, the IP switch 116 can maintain per-Initiator Port, Target Port, NameSpaceID (ITN) metrics. The IP switch 116 can maintain the per-ITN metrics for efficient lookups/updates into ASIC memory of the IP switch 116.

In various cases, the IP switch 116 can identify the I/O metrics, which can be utilized by the network management device 114 to build a complete SAN analytics solution. The complete SAN analytics solution can be built, based on the IP switches 116 streaming I/O metrics, Flow Table, interface and error metrics to a switch vendor controller. For example, the controller may execute software programs/applications utilized for troubleshooting, root-causing, and early remediation of issues associated with operation of the IP switches 116. The complete SAN analytics solution can be utilized by network management device 114 to build a one-view data structure utilized to represent an entire storage infrastructure. The entire storage infrastructure may span all the IP and FC SANs including the IP switches 116 and the FC switches 118.

Figure 5A:
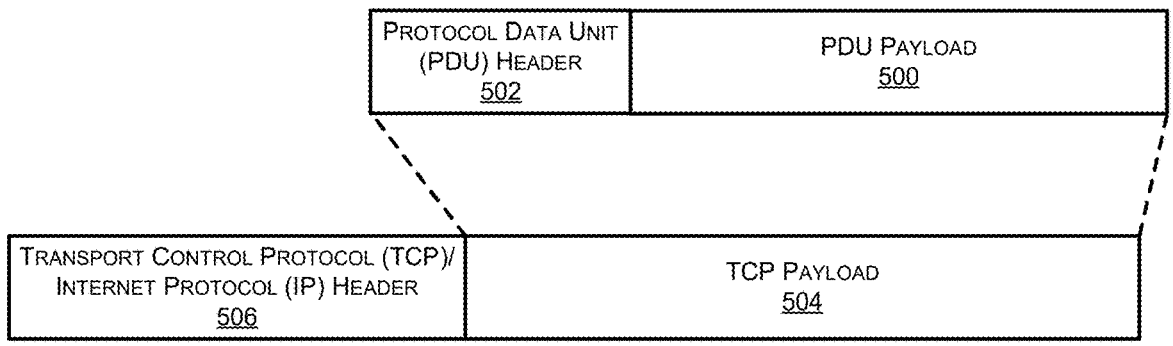
FIGS. 5A-5C illustrate example NVMe-TCP PDU packaging for NVMe I/O operation-oriented and IP switch-based analytics management.
Figure 5B:
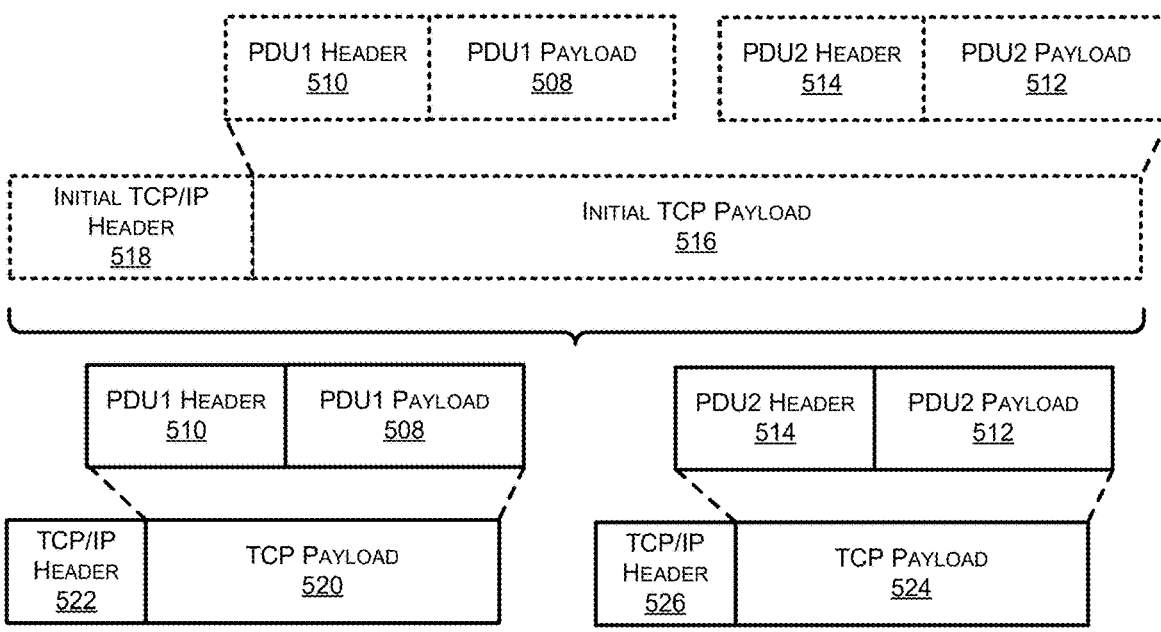
Figure 5C:
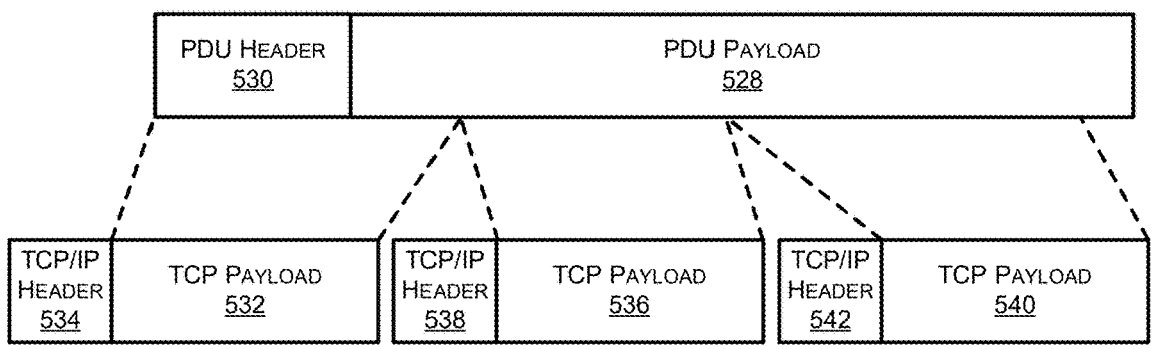

FIGS. 5A-5C illustrate example NVMe-TCP Protocol Data Unit (PDU) packaging for NVMe I/O operation-oriented and IP switch-based analytics management. The NVMe-TCP PDU packaging can be performed on a host (e.g., and a switch). The NVMe-TCP PDU packaging can be performed to enable parsing by one or more switches (e.g., the IP switch(es) 116, as discussed above with reference to FIG. 1) of TCP payloads, based on various cases (e.g., at least one of Case-A-Case-C, as discussed below, in further detail, with reference to FIGS. 5A-5C). The NVMe-TCP PDU packaging can be performed to enable parsing by the IP switch(es) 116 of NVMe/TCP PDUs based on at least one of the Case-A-Case-C. The switch(es) 116 can collect the same types of metrics that would otherwise be available for data storage via Fiber Channel (FC) switches (e.g., the FC switch(es) 118, as discussed above with reference to FIG. 1).

Referring to FIG. 5A, in some examples, for instance with the Case-A of NVMe-TCP PDU packaging, a PDU including a PDU payload 500 and PDU header data, with a PDU header 502, can be transported in a TCP payload 504. The TCP payload 504 can be transported along with TCP/IP header data including a TCP/IP header 506. In some examples, the PDU of Case-A can be utilized to implement any of various types of PDUs, such as command capsule PDUs, C2H data PDU(s) 210, H2C data PDU(s) 312, and any of various other types of PDUs, as discussed above with reference to FIGS. 2-4B.

Referring to FIG. 5B, in some examples, for instance with the Case-B NVMe-TCP PDU packaging, a PDU including i) a PDU1 payload 508 and PDU header data, with a PDU1 header 510, and ii) a PDU2 payload 512 and PDU header data, with a PDU2 header 514, can be transported in an initial TCP payload 516. The initial TCP payload 516 can be transportable along with TCP/IP header data including an initial TCP/IP header 518. In some examples, the PDU of Case-B can be utilized to implement any of various types of PDUs, such as individual C2H data PDU(s) 210, individual H2C data PDU(s) 312, and individual PDUs for the packaging, as discussed above with reference to FIGS. 2-4.

In some examples, the initial TCP payload 516 can be split (e.g., subdivided) by the host 120 and/or the IP storage device(s) that originate the TCP segments (e.g., the initial TCP payload 516 is not split (e.g., subdivided) by the IP switch(s) 116). In various cases, the initial TCP payload 516 can be split based on handshaking between an IP switch 116 and an end point (e.g., a storage device 106 or a host 120). For instance, the initial TCP payload 516 can be split (e.g., subdivided) into two or more TCP sub-segments. The two or more TCP sub-segments can include a TCP sub-segment (e.g., a TCP payload) 520 and a TCP sub-segment (e.g., a TCP payload) 524, which can be utilized to transport a group of PDUs. For example, the TCP payload 520 and the TCP payload 524 can be utilized to transport the group of PDUs, which can include i) the PDU1 payload 508 and the PDU1 header, and ii) the PDU2 payload 512 and the PDU2 header 514, respectively. For example, individual TCP sub-segments can include an C2H data PDU 210 from among the group. The TCP payload 520 can be transported along with a TCP/IP header 522. The TCP payload 524 can be transported along with a TCP/IP header 526.

In various cases, the handshaking can include handshaking between the switch 116, and the IP storage device 106 and/or the host 120. The handshaking can be performed based on a software handshake protocol. The software handshake protocol can be designed (e.g., LLDP TLV) to be used to enable the end point NVMe/TCP stack (e.g., the storage device 106 and/or the host 120) to transition in and out of a mode (e.g., a first mode) that does not utilize the handshaking, and a mode (e.g., a second mode) that utilizes the split TCP segment (e.g., the TCP sub-segments) without the handshaking. For instance, the mode that does not utilize the handshaking is utilized to transport the PDUs (e.g., the PDU including the PDU1 header 510 and the PDU1 payload 508, and the PDU including the PDU2 header 514 and the PDU2 payload) in a TCP segment that also includes the metadata header 416, a TCP/IP header, and a TCP payload.

By including, in the TCP payloads 520 and 524, the respective PDUs (e.g., i) the PDU1 payload 508 and the PDU1 header 510, and ii) the PDU2 payload 512 and the PDU2 header 514), the Case-B NVMe-TCP PDU packaging is converted to Case-A NVMe-TCP PDU packaging. By way of example, the initial TCP payload 516 within multiple PDUs is converted to individual TCP payloads (e.g., the TCP payload 520 and the TCP payload 524) with corresponding PDUs (e.g., i) the PDU1 payload 508 and the PDU1 header 510, and ii) the PDU2 payload 512 and the PDU2 header 514)). Based on the conversion, the TCP payload 520 includes the PDU1 payload 508 and the PDU1 header 510; and the TCP payload 524 includes the PDU2 payload 512 and the PDU2 header 514.

The conversion in Case-B (e.g., in the second mode) according to the techniques discussed herein improves upon conventional techniques for systems that are unable to process certain types of payloads with sizes above threshold sizes. Existing systems may be unable to process metrics associated with TCP payloads with multiple PDUs, due to hardware constraints limiting how much data in the TCP payloads is able to be processed. Because of the limitations of existing systems, IP switches cannot be utilized to gather metrics that may otherwise be gathered utilizing FC switches.

In contrast to inabilities of programmable hardware in existing systems to compute metrics associated with a TCP payload that has multiple PDUs, the conversion in Case-B according to the techniques discussed herein circumvents and avoids such problems. For example, programmable hardware (ASICs, FGPAs, DPUs, etc.) can compute the TCP payloads 520 and 524 with the single PDUs (e.g., the single PDU payloads 508 and 512) based on the initial TCP payload 516 being converted to the multiple TCP payloads 520 and 524. The TCP payloads 520 and 524 can be transported with the individual PDU payloads 508 and 512, respectively. The multiple TCP payloads 520 and 524 can be transported with the individual PDU payloads 508 and 512, respectively, to enable the programmable hardware to process the PDU payloads 508 and 512, in the respective TCP payloads 520 and 524.

Referring to FIG. 5C, in some examples, for instance with the Case-C of NVMe-TCP PDU packaging, a PDU can include a portion of a PDU payload 528 being transported, along with PDU header data, which has a PDU header 530, in a TCP payload 532. In some examples, the PDU of Case-C can be utilized to implement any of various types of PDUs.

The TCP payload 532 can be transported along with TCP/IP header data including a TCP/IP header 534. The PDU can include a portion of the PDU payload 528 being transported in a TCP payload 536. The TCP payload 536 can be transported along with TCP/IP header data including a TCP/IP header 538. The PDU can include a portion of the PDU payload 528 being transported in a TCP payload 540. The TCP payload 540 can be transported along with TCP/IP header data including a TCP/IP header 542.

The PDU header 530 can include state information. The state information can identify, from a first segment (e.g., the TCP payload 532), which has PDU header 530, whether the TCP payload 532 is a first portion or a later portion of a group of TCP payloads. The group of TCP payloads can include the TCP payloads 532, 536, and 540, for example. By utilizing the state information, a device (e.g., the host device 202/302 and/or the NVMe storage controller 204/304, as discussed above with respect to FIGS. 2 and 3) receiving the TCP payloads 532, 536, and 540 can identify whether the TCP payload 532 includes a first portion of the PDU payload 528, or a non-first portion of the PDU payload 528. All the following TCP segments can be ignored with respect to PDU header identification and/or state information identification.

While the TCP segment can include the metadata header 416 according to the Case-B, as discussed above in the current disclosure, it is not limited as such. In some examples, individual TCP segments can include a metadata header, similar to the metadata header 416, according to any case (e.g., the Case-A, the Case-C, etc.).

Figure 6:
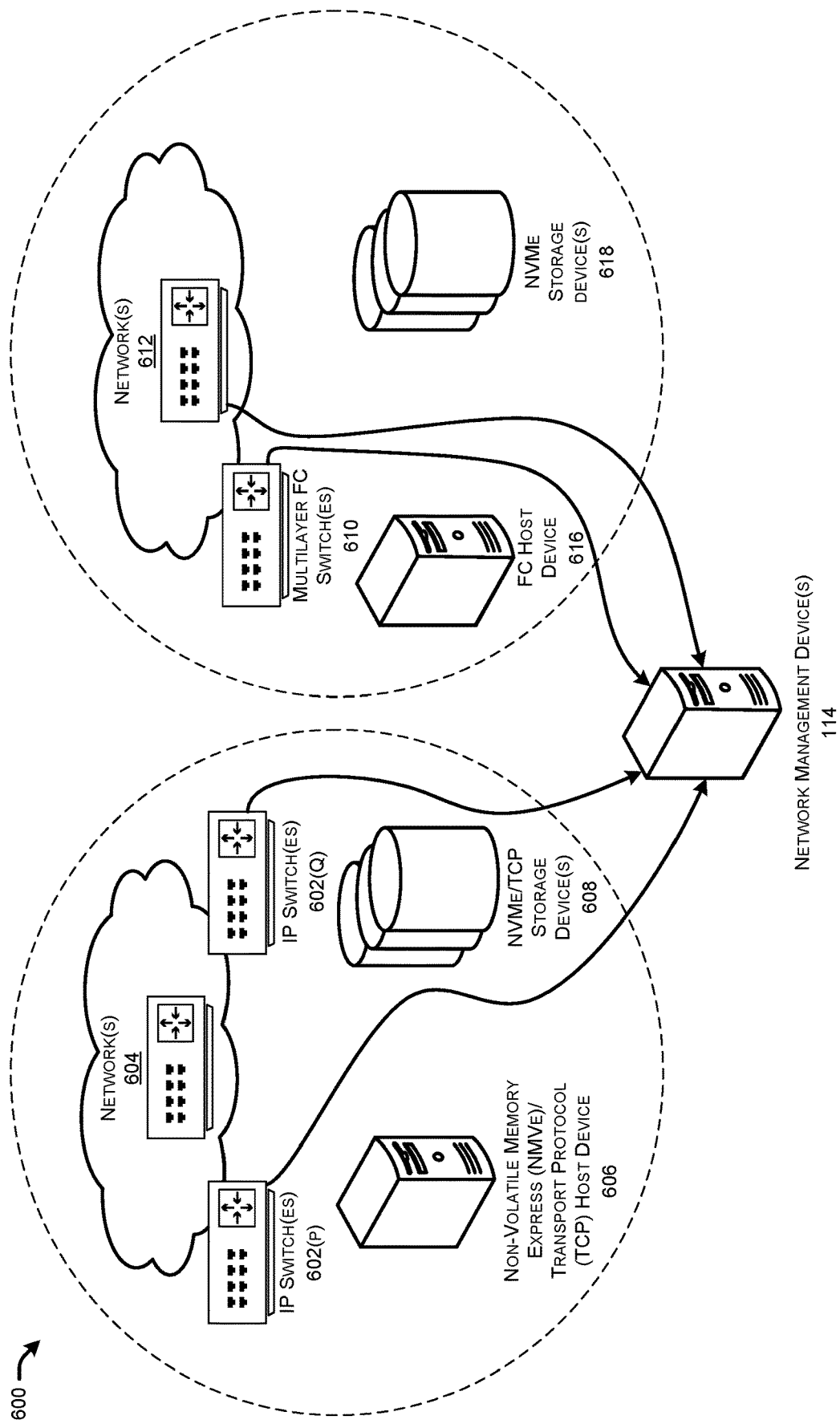

FIG. 6 illustrates an example environment 600 including an IP switch-based and Fiber Channel (FC) switch-based analytics solution.

The analytics solution can be based on analytics captured by one or more IP switches 602(P), 602(Q) (collectively referred to herein as "IP switch(es) 602") of any number. The IP switches 602 can include one or more leaf top-of-rack (ToR) switches. The IP switch(es) 602 can include one or more switches of any other types. In various examples, individual ones of the leaf ToR switches can represent any other type of switch.

One or more metrics can be managed utilizing the environment 600. The metric(s) can include one or more IP switch-based metrics being managed utilizing one or more networks (e.g., a fabric) 604. The metric(s) may be associated with one or more NVMe/TCP storage devices 608.

In some examples, individual ones of the IP switch(es) 602 and any of the IP switch(es) 116, as discussed above with reference to FIG. 1, can be implemented separately from one another, or as the same IP switch. An NVMe/TCP storage controller (e.g., the NVMe storage controller 204 and/or the NVMe storage controller 304, as discussed above with respect to FIGS. 2 and 3) can be integrated within, or separate from, at least one of the I/O switch(es) 116. In some examples, the NVMe/TCP host device 606 can be utilized to implement any of the host server(s) 120, the host device 202, and the host device 302, as discussed above with reference to FIGS. 1-3. In some examples, the network(s) 604 and the network(s) 112, as discussed above with reference to FIGS. 1-3.

In various implementations, a SAN from among the network(s) 604 can be utilized for analytics management, which can include managing (e.g., identifying, determining, collecting, gathering, modifying, adding, deleting, distributing, etc., or any combination hereof) the metrics. The SAN can be utilized to perform analytics management in a similar way as any types of analytics management of which a FC SAN (e.g., a SAN from among the network(s) 612, as discussed below in further detail) may be capable of performing.

The analytics management utilizes FC switch-based analytics management based on analytics received from FC switches (or "FC switch(es)") 610 of any number. The FC switches 610 can include multilayer FC switches. The metric(s) can include one or more FC switch-based metrics being managed utilizing one or more networks (e.g., a fabric) 610. The metric(s) can be managed utilizing an FC host device 616. The metric(s) may be associated with one or more NVMe storage devices 618.

In some examples, individual ones of the FC switch(es) 610 and any FC switch 118, as discussed above with reference to FIG. 1, can be implemented separately from one another, or as the same FC switch. In some examples, individual ones of the network(s) 604 and any network 110, as discussed above with reference to FIG. 1, can be implemented separately from one another, or as the same network.

Analytics management can be performed utilizing the IP switch(es) 602 in a different way from analytics management being performed utilizing the FC switch(es) 610, to utilize the IP switch(es) 602 to manage the same types of metrics of which the FC switch(es) 610 may be capable of managing. The IP switch(es) 602 can perform the analytics management utilizing metadata (e.g., the metadata and/or the TCP sub-segments being utilized for delivery of PDUs, as discussed above with reference to FIGS. 1-5C).

FIG. 7 illustrates example tables utilized for NVMe-TCP PDU packaging. In some examples, a network management device (e.g., the network management device 114, as discussed above with reference to FIG. 1, which may operate utilizing the analytics engine 426, as discussed above with reference to FIG. 4) can perform various types of analytics management. For example, the network management device 114 can manage the metric(s) utilizing one or more metrics tables (e.g., the metrics table(s) 428, as discussed above with reference to FIG. 4B. The metrics tables can include a connection table 700 and an IO table 702.

The connection table 700 can include one or more virtual Local Area Network (VLAN) port metrics, one or more host IP metrics, one or more target IP metrics, one or more TCP source port metrics, one or more command identifier (command identifier (CID) metrics, one or more Namespace Identifier (NSID) metrics, one or more bytes remain ingress, egress metrics, one or more PDU cache metrics, one or more connection metrics list metrics. The entries in the connection table 700 can be preserved beyond completion of the I/Os (e.g., I/O operations).

The connection table 700 may include per-NVMe/TCP connection metrics with a tuple as a key. The connection table 700 can manage an entry for every NVMe/TCP connection that was ever seen by the ASIC. In some examples, for every I/O transaction within the connection table, an entry can be added to the connection table 700. A size of the connection table 700 may depend on a number of I/O queues supported on storage controllers and a number of hosts (e.g., a number of the host device(s) 606) zoned with the storage controllers.

The IO table 702 can include one or more VLAN port metric(s), one or more host IP metrics, one or more target IP metrics, one or more TCP source port metrics, one or more CID metrics, one or more local ID metrics, one or more NSID metrics, and one or more I/O state metrics. A size of the IO table 702 may depend on queue depths supported on IO queues (e.g., the size may depend on memory limits of the ASIC of the NVMe storage controller).

When an I/O Operation begins an entry can be made the IO table 702. As the I/O Operation finishes, the corresponding entry can be removed from the IO table 702. In some example, for every I/O Operation with which a tuple may be associated, a combination of VLAN/port source IP identifier (host IP), a destination IP identifier (target IP), a source port identifier (TCP port) (e.g., a constant metric not maintained), a command ID (an NVMe/TCP command in a PDU header), and an NSID can be managed using the IO table 702. The NSID can indicate a logical disk to which data is being written. The number of bytes remaining can identify, such as for the Case-C, how many bytes of PDU are already seen of a PDU.

Individual entries in the IO table 702 can be removed at completion of a corresponding I/O. The states (S1, S2, . . . . Sn) can be maintained for every I/O state (e.g., whether an I/O Operation is beginning, an I/O Operation is ending, etc.). As an I/O Operation (e.g., I/O communication) (e.g., I/O transaction) is ending, metrics (such as read completion time) and for a state can be computed for the I/O Operation.

As the metrics for the I/O Operation that is ending are computed, the metrics can be entered into the connection table 700. Updating of the entries in the connection table 700 can include removing the entries from the IO table 702 and adding entries to the connection table 700.

In some examples, as the analytics engine 426 starts to receive PDUs bi-directionally from a given port and from the PDU Extractor, an I/O reconstruction logic per-connection can be utilized by the analytics engine 426 to put the PDUs in sequence according to a TCP sequence number and a PDU type on a per-port basis. Individual ingress/egress PDU headers per-port can be correlated and tied to an I/O Operation using two hash tables (e.g., the connection table 700 and the IO Table 702). The connection table 700 and the IO Table 702 can be maintained in memory (e.g., the ASIC memory of the IP switch 116) by the analytics engine 426. These connection table 700 and the IO Table 702 may act as the datastore of all the NVMe/TCP I/O metrics.

The connection table 700 and/or the IO table 702 can be utilized to manage one or more I/O metrics for Read/Write Operations. For example, the metric(s) for Read/Write Operations managed utilizing the connection table 700 can include a total completion time (CT) metric, a max completion time metric, a total DAL metric, a max DAL metric, a total host delay metric, a max host delay metric, a total I/O count metric, a total I/O size metric, a minimum I/O size metric, a max I/O size metric, a total inter-I/O gap metric, a minimum inter-I/O gap metric, a total bus time metric, and/or a max outstanding I/O count. The metric(s) for Read/Write Operations managed utilizing the IO table 702 can include an instantaneous outstanding I/O count metric.

The connection table 700 can be utilized to manage one or more I/O metrics for Read Operations that are separate from Write Operations. For example, the metric(s) that are separate for Read Operations and Write Operations can include a total count of individual and/or different error codes at NVMe, NVMe/oF, NVMe-TCP, TCP layers (e.g., for C2H/H2C PDUs); and/or a total count of one or more different TCP connection characteristics metrics (e.g., a flow control metric, selective acknowledgement metric (SACK), a window size change metric, a retransmission of segments metric, or any combination thereof).

PDU fields may be used to tie together PDUs of a single I/O Operation. For example, the PDU fields used to tie together PDUs of the single I/O Operation can include a command ID (e.g., an NVMeHdr.SQE.CID) from a command PDU that can be utilized to create a new entry in the IO table 702. The entry can be populated in the command ID field of the IO table 702. One or more other PDU fields (e.g., a PSH.CCCID field that is in the corresponding H2C/C2H DATA and R2T PDUs, and that matches the IO Table CID) (e.g., a PSH.RCCQE that is a response PDU matching the IO Table CID) can be used to tie together PDUs of the single I/O Operation. All non-command PDUs can be looked up using data (e.g., a tuple and a command ID) as the key in the IO Table 702.

The metric(s) being tracked via the IP switch-based metrics management can be utilized for various purposes in the context of NVMe/TCP. For example, a selective acknowledgement metric identifying a number of selective acknowledgements (SACKs) per I/O connection may be an indicative of network congestion. A window size metric identifying a shrinking window size (e.g., a window size that is less than a previous window size and/or less than a window size threshold), which may be an indication of congestion and/or congestion control. A window size may be an amount of unacknowledged data that can be outstanding between a sender (e.g., the host device and/or the storage device) and a receiver (e.g., the host device and/or the storage device). The window size may be an amount of data that can be in transit, somewhere in the network, between the sender and the source.

The metric(s) may include the flow control metric identifying a flow control, which may indicate congestion on end-points (e.g., the host device and/or the storage device). The flow control may indicate whether the sender is overwhelming the receiver by sending packets faster than then receiver can consume. The metric(s) may include the retransmission metric identifying one or more retransmissions of segments, which may indicate a congested network dropping packets. These metrics (e.g., per-connection error metrics) when correlated with I/O metrics can be utilized to accurately troubleshoot and pinpoint performance problems in an IP SAN. The metrics collected in the connection table 700 and/or the IO Table 702, along with the I/O metrics (e.g., in TCP flow tables), can be periodically read by a switch CPU (e.g., CPU in the IP switch(es) 116), encoded and exported outside of the switch using telemetry streaming interfaces (e.g., an open-source high performance remote procedure call (RPC) framework, such as gRPC). A metrics collection/export architecture (e.g., an architecture as discussed herein by which the metric(s) may be gathered using the IP switch(es) 116) can be made identical to SAN analytics telemetry streaming on existing FC switches today. In contrast to the SAN analytics telemetry streaming on existing FC switches today, the collection/export architecture according to the techniques discussed herein can be utilized to collect/export the metrics (e.g., the NVMe/TCP I/O metrics) with minimal integration effort.

Figure 8A:
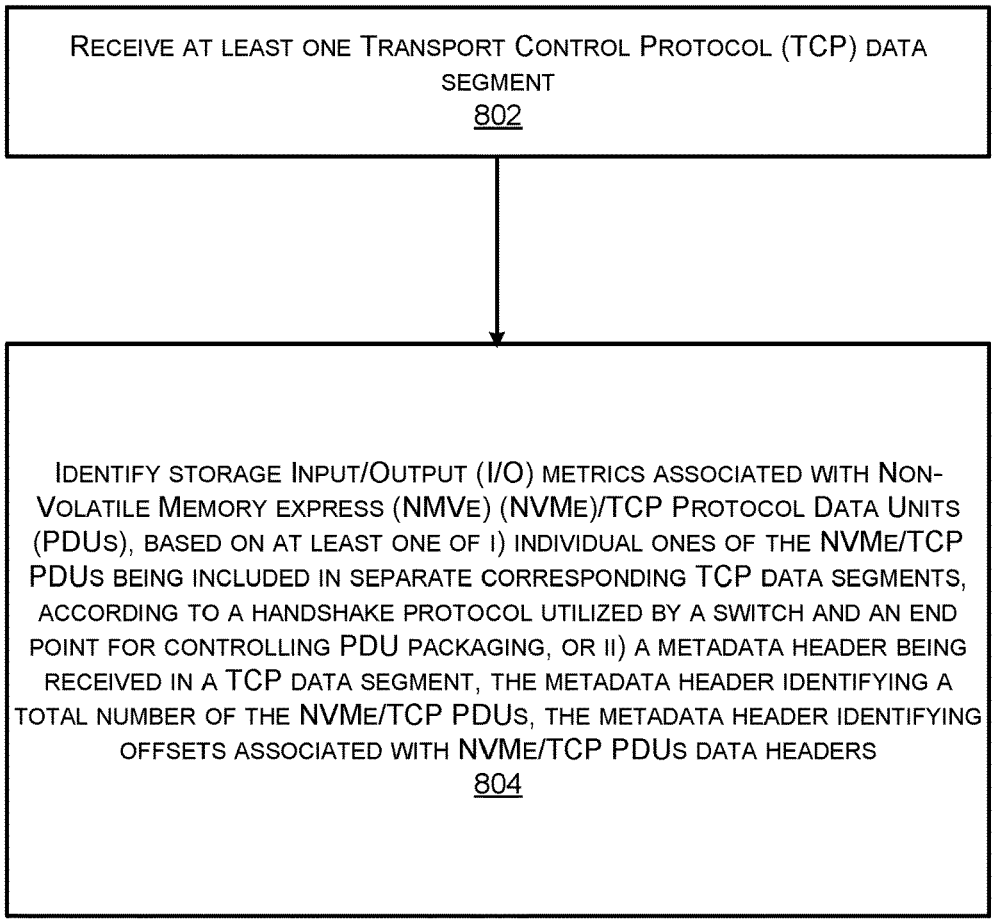

FIGS. 8A and 8B illustrate flow diagrams of example processes for the devices in the SAN management distributed architecture as described in FIG. 1. With respect to FIG. 8A, a process 800 may be performed by an entity, such as individual IP switch(es) 116, as described above with reference to FIG. 1.

At 802, an IP switch 116 can receive at least one TCP data segment. The at least one TCP data segment can be received along with PDUs associated with Read Operations or Write Operations.

At 804, the IP switch 116 can identify storage I/O metrics associated with NVMe (NVMe)/TCP PDUs, based on at least one of i) individual ones of the NVMe/TCP PDUs being included in separate corresponding TCP data segments, according to a handshake protocol utilized by a switch and an end point for controlling PDU packaging, or ii) a metadata header being received in a TCP data segment, the metadata header identifying a total number of the NVMe/TCP PDUs, the metadata header identifying offsets associated with NVMe/TCP PDUs data headers. The NVMe/TCP PDUs can be included in a TCP payload, which can be separated into TCP data segments, such as TCP sub-segments. The metadata header can be received in a metadata PDU.

With respect to FIG. 8B, a process 806 may be performed by an entity. For example, the process 806 may be performed by individual IP switch(es) 116, as described above with reference to FIG. 1.

At 808, an IP switch 116 can receive at least one TCP data segment. The at least one TCP data segment can be received along with PDUs associated with Read Operations or Write Operations.

At 810, the IP switch 116 can identify information associated with NVMe (NVMe)/TCP PDUs, based on at least one of i) individual ones of the NVMe/TCP PDUs being included in separate corresponding TCP data segments, according to a handshake protocol utilized by a switch and an end point for controlling PDU packaging, or ii) a metadata header being received in a TCP data segment, the metadata header identifying a total number of the NVMe/TCP PDUs, the metadata header identifying offsets associated with NVMe/TCP PDUs data headers. The NVMe/TCP PDUs can be included in a TCP payload, which can be separated into TCP data segments, such as TCP sub-segments. The metadata header can be received in a metadata PDU.

At 812, the IP switch 116 can store the information in connection and IO tables.

At 814, the IP switch 116 can provide, to the network management device 114, storage I/O metrics based on the information stored in the connection and IO tables.

Figure 9:
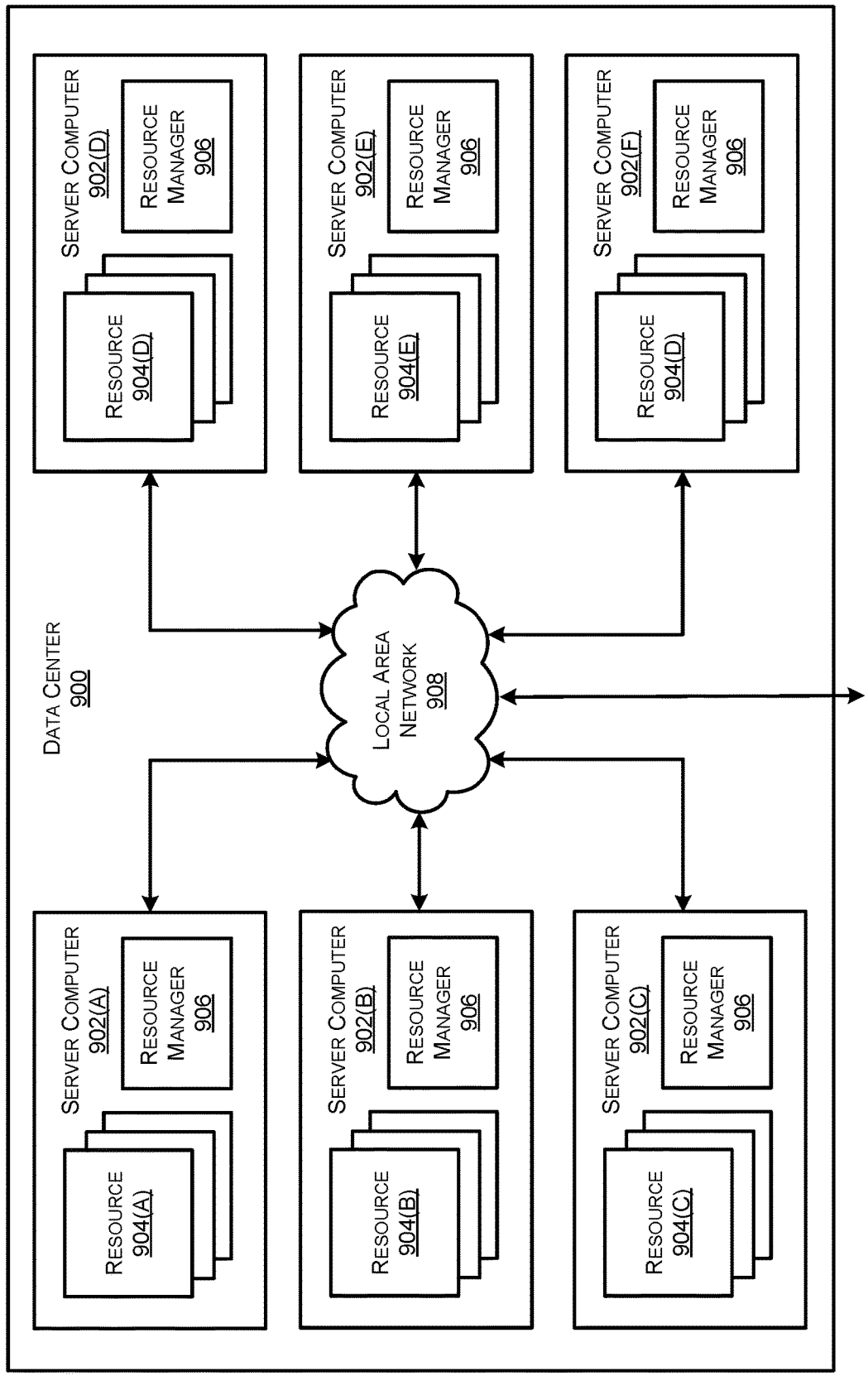
FIG. 9 is a computing system diagram illustrating a configuration for a data center 900 that can be utilized to implement aspects of the technologies disclosed herein.

FIG. 9 is a computing system diagram illustrating a configuration for a data center 900 that can be utilized to implement aspects of the technologies disclosed herein. The example data center 900 shown in FIG. 9 includes several server computers 902A-902F (which might be referred to herein singularly as "a server computer 902" or in the plural as "the server computers 902") for providing computing resources. In some examples, the resources and/or server computers 902 may include, or correspond to, the any type of networked device (e.g., network device) described herein. Although described as servers, the server computers 902 may comprise any type of networked device, such as servers, switches, routers, hubs, bridges, gateways, modems, repeaters, access points, etc.

The server computers 902 can be standard tower, rackmount, or blade server computers configured appropriately for providing computing resources. In some examples, the server computers 902 may provide computing resources 904 including data processing resources such as VM instances or hardware computing systems, database clusters, computing clusters, storage clusters, data storage resources, database resources, networking resources, and others. Some of the servers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. Server computers 902 in the data center 900 can also be configured to provide network services and other types of services.

In the example data center 900 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 900, between each of the server computers 902A-902F in each data center 900, and, potentially, between computing resources in each of the server computers 902. It should be appreciated that the configuration of the data center 900 described with reference to FIG. 9 is merely illustrative and that other implementations can be utilized.

In some examples, the server computers 902 may each execute one or more application containers and/or virtual machines to perform techniques described herein.

In some instances, the data center 900 may provide computing resources, like application containers, VM instances, and storage, on a permanent or an as-needed basis. Among other types of functionality, the computing resources provided by a cloud computing network may be utilized to implement the various services and techniques described above. The computing resources 904 provided by the cloud computing network can include various types of computing resources, such as data processing resources like application containers and VM instances, data storage resources, networking resources, data communication resources, network services, and the like.

Each type of computing resource 904 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 904 not mentioned specifically herein.

The computing resources 904 provided by a cloud computing network may be enabled in one embodiment by one or more data centers 900 (which might be referred to herein singularly as "a data center 900" or in the plural as "the data centers 900"). The data centers 900 are facilities utilized to house and operate computer systems and associated components. The data centers 900 typically include redundant and backup power, communications, cooling, and security systems. The data centers 900 can also be located in geographically disparate locations. One illustrative embodiment for a data center 900 that can be utilized to implement the technologies disclosed herein will be described below with regard to FIG. 8.

Figure 10:
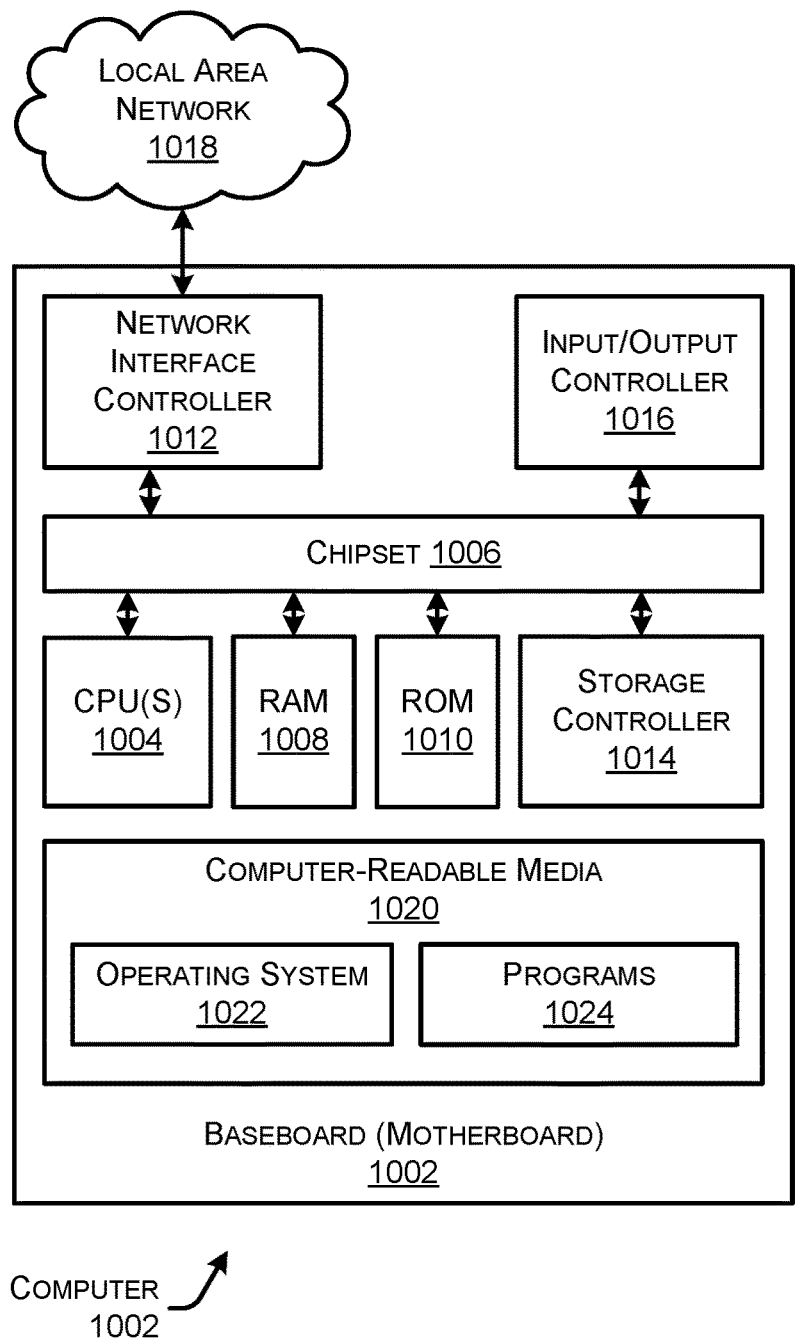
FIG. 10 shows an example computer architecture for a server computer capable of executing program components for implementing the functionality described above.

FIG. 10 shows an example computer architecture 1000 for a computer capable of executing program components for implementing the functionality described above. For example, the computer hardware architecture 1000 can be used to implement one or more switches (e.g., the IP switch(es) 116, the host server(s) 120, and/or any other devices of the SAN management architecture, as discussed above with reference to FIG. 1).

The computer architecture 1000 shown in FIG. 10 illustrates a conventional server computer, workstation, desktop computer, laptop, tablet, network appliance, smartphone, or other computing device, and can be utilized to execute any of the software components presented herein. The computer architecture 1000, for example, can be utilized to implement a distributed application system hosting an application service to perform various functions discussed herein. The computer hardware architecture 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a random-access memory (RAM) 1008, used as the main memory in the computer 1000. The chipset 1006 can further provide an interface to a computer-readable storage medium such as a Read-Only Memory (ROM) 1010 or Non-Volatile RAM (NVRAM) for storing basic routines that help to start the computer 1000 and to transfer information between the various components and devices. The ROM 1010 or NVRAM can also store other software components necessary for the operation of the computer 1000 in accordance with the configurations described herein.

The computer 1000 can also include a Network Interface Controller (NIC) 1012, a storage controller 1014, and one or more I/O controllers 1016. The computer 1000 can operate in a networked environment using logical connections to remote computing devices and computer systems through one or more networks (e.g., a Local Area Network (LAN)) 1018. The chipset 1006 can include functionality for providing network connectivity through the NIC 1012, such as a gigabit Ethernet adapter. The NIC 1012 is capable of connecting the computer 1000 to other computing devices over the network(s) 1018. Multiple NICs 1012 can be present in the computer 1000, connecting the computer 1000 to other types of networks and remote computer systems. In some instances, the NICs 1012 may include an ingress port and an egress port.

The computer 1000 can be connected to a computer readable media (e.g., a storage device) 1020 that provides non-volatile storage for the computer. The storage device 1020 can store an operating system 1022, programs 1024, and data, which have been described in greater detail herein. The storage device 1020 can be connected to the computer 1000 through the storage controller 1014 connected to the chipset 1006. The storage device 1020 can consist of one or more physical storage units. The storage controller 1014 can interface with the physical storage units through a serial attached small computer system interface (SCSI) (SAS) interface, a serial advanced technology attachment (SATA) interface, a Fiber Channel (FC) interface, or other type of interface for physically connecting and transferring data between computers and physical storage units.

The computer 1000 can store data on the storage device 1020 by transforming the physical state of the physical storage units to reflect the information being stored. The specific transformation of physical state can depend on various factors, in different embodiments of this description. Examples of such factors can include the technology used to implement the physical storage units, whether the storage device 1020 is characterized as primary or secondary storage, and the like.

For example, the computer 1000 can store information to the storage device 1020 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage device 1020 by detecting the physical states or characteristics of one or more locations within the physical storage units.

In addition to the mass storage device 1020 described above, the computer 1000 can have access to other computer-readable storage media to store and retrieve information, such as program modules, data structures, or other data. In some examples, the operations performed by any network node described herein may be supported by one or more devices similar to computer 1000. Stated otherwise, some of or all the operations performed by a network node may be performed by one or more computers (or "computer devices") 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1020 can store an operating system 1022 used to control the operation of the computer 1000. According to one embodiment, the operating system comprises the LINUX (ITM) operating system. According to another embodiment, the operating system includes the WINDOWS™ SERVER operating system from MICROSOFT Corporation of Redmond, Washington. According to further embodiments, the operating system can include the UNIX™ operating system or one of its variants. It should be appreciated that other operating systems can also be used. The storage device 1020 can store other operating systems or application programs and data used by the computer 1000.

In one embodiment, the storage device 1020 or other computer-readable storage media is encoded with computer-executable instructions which can be loaded into the computer 1000. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above regarding FIGS. 1-9. The computer 1000 can also include computer-readable storage media having instructions stored thereupon for performing any of the other computer-implemented operations described herein.

As illustrated in FIG. 10, the storage device 1020 stores an operating system 1022, one or more programs 1024, which may include one or more processes, as well as one or more applications, described above. The operating system 1022 may include a firewall and a kernel. The operating system 1022 and/or the programs 1024 may include instructions that, when executed by the CPU(s) 1004, cause the computer 1000 and/or the CPU(s) 1004 to perform one or more operations.

The computer 1000 can also include one or more I/O controllers 1016 for receiving and processing input from different input devices, such as a keyboard, a mouse, a touchpad, a touch screen, or other types of input devices. Similarly, an I/O controller 1016 can provide output to a display, such as a computer monitor, a flat-panel display, or other type of output device. The computer 1000 might not include all the components shown in FIG. 10, can include other components that are not explicitly shown in FIG. 10, or might use an architecture completely different than that shown in FIG. 10.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, the claims are not necessarily limited to the specific features or acts described. Rather, the specific features and acts are merely illustrative of some embodiments that fall within the scope of the claims of the application.

What is claimed is:

1. A method, comprising:
   receiving at least one Transport Control Protocol (TCP) data segment; and
   identifying storage Input/Output (I/O) metrics associated with Non-Volatile Memory express (NVMe)/TCP Protocol Data Units (PDUs), based on at least one of i) individual ones of the NVMe/TCP PDUs being included in separate corresponding TCP data segments, according to a handshake protocol utilized by a switch and an end point for controlling PDU packaging, or ii) a metadata header being received in a TCP data segment, the metadata header identifying a total number of the NVMe/TCP PDUs, the metadata header identifying offsets associated with NVMe/TCP PDUs data headers.

2. The method of claim 1, wherein identifying the storage I/O metrics further comprises identifying the storage I/O metrics from a network, based on individual ones of the NVMe/TCP PDUs being included in the separate corresponding TCP data segments, according to the handshake protocol utilized by the switch and the end point for controlling the PDU packaging.

3. The method of claim 1, wherein identifying the storage I/O metrics further comprises identifying the storage I/O metrics, based on the metadata header.

4. The method of claim 1, wherein the metadata header is received in the TCP data segment, and
   wherein identifying the storage I/O metrics further comprises:
   identifying the metadata header;
   identifying the NVMe/TCP PDUs data headers at the offsets; and
   identifying the storage I/O metrics based on the NVMe/TCP PDUs data headers and the NVMe/TCP PDUs.

5. The method of claim 1, further comprising:
   storing, in an IO table, a set of I/O transaction metrics associated with I/O transactions until completion of the I/O transactions, the I/O transactions being associated with delivery of the NVMe/TCP PDUs; and
   storing, in a connection table, storage of a set of connection metrics associated with a set of transactions that comprise the I/O transactions.

6. An Internet Protocol (IP) switch comprising:
   one or more processors; and
   memory storing computer-executable instructions that, when executed by the one or more processors, cause the one or more processors to perform operations comprising:
   receiving at least one Transport Control Protocol (TCP) segment; and
   identifying storage Input/Output (I/O) metrics associated with Non-Volatile Memory express (NVMe)/TCP Protocol Data Units (PDUs), based at least in part on at least one of i) individual ones of the NVMe/TCP PDUs being included in separate corresponding TCP data segments, according to a handshake protocol utilized by a switch and an end point for controlling PDU packaging, or ii) a metadata header being received in a TCP data segment, the metadata header identifying a total number of the NVMe/TCP PDUs, the metadata header identifying offsets associated with NVMe/TCP PDU data headers.

7. The IP switch of claim 6, wherein identifying the storage I/O metrics further comprises identifying the storage I/O metrics from a network, based on individual ones of the NVMe/TCP PDUs being included in the separate corresponding TCP data segments, according to the handshake protocol utilized by the switch and the end point for controlling the PDU packaging.

8. The IP switch of claim 6, wherein identifying the storage I/O metrics further comprises identifying the storage I/O metrics based on the metadata header being received in the TCP data segment.

9. The IP switch of claim 6, wherein the metadata header is received in the TCP data segment, and
   wherein identifying the storage I/O metrics further comprises:
      identifying the metadata header;
      identifying the NVMe/TCP PDUs data headers at the offsets; and
      identifying the storage I/O metrics based on the NVMe/TCP PDUs data headers and the NVMe/TCP PDUs.

10. The IP switch of claim 6, the operations further comprising:
   storing, in an IO table, storage of a set of I/O transaction metrics associated with I/O transactions until completion of the I/O transactions, the I/O transactions being associated with delivery of the NVMe/TCP PDUs; and
   storing, in a connection table, storage of a set of connection metrics associated with a set of transactions that comprise the I/O transactions.

11. The IP switch of claim 6, the operations further comprising:
   identifying, from among TCP metrics of the storage I/O metrics, a selective acknowledgement metric identifying a number of selective acknowledgements (SACKs) per I/O connection.

12. The IP switch of claim 6, the operations further comprising:
   identifying, from among TCP metrics of the storage I/O metrics, a window size metric identifying a window size that is an indication of congestion.

13. The IP switch of claim 6, the operations further comprising:
   identifying, from among the TCP metrics of the storage I/O metrics, a flow control metric identifying a flow control that indicates a sender is overwhelming a receiver by sending packets faster than then the receiver can consume.

14. One or more non-transitory computer readable medium storing instructions that, when executed, causes a processor to perform operations, comprising:
   extracting, via execution of a User Defined Function (UDF), at least one of i) two or more Protocol Data Unit (PDU) headers in two or more Transport Control Protocol (TCP) segments according to a handshake protocol, or ii) the two or more PDU headers based at least in part on a metadata PDU header in a single TCP segment; and
   identifying storage Input/Output (I/O) metrics by analyzing the at least one of i) the two or more PDU headers, or ii) the metadata PDU header.

15. The one or more non-transitory computer readable medium of claim 14, wherein the extracting further comprises executing individual ones of extractors in a corresponding Internet Protocol (IP) switch,
   wherein each of the extractors is executed as the UDF;
   wherein the identifying the storage I/O metrics further comprises identifying individual ones of corresponding groups of the storage I/O metrics associated with corresponding ones of the IP switches, and
   wherein a complete SAN analytics solution associated with the groups of the storage I/O metrics is utilized by a network management device to build a one-view data structure representing an entire storage infrastructure.

16. The one or more non-transitory computer readable medium of claim 14, the operations further comprising:
   receiving Non-Volatile Memory express (NVMe)/TCP SAN traffic utilized by an Internet Protocol (IP) switch to deduce storage I/O metrics as the storage I/O metrics, the NVMe/TCP SAN traffic transiting the IP switch independent of host/storage vendor.

17. The one or more non-transitory computer readable medium of claim 14, wherein extracting further comprises extracting the two or more PDU headers based at least in part on the metadata PDU header
   the operations further comprising:
      parsing and extracting, by an Internet Protocol (IP) switch, the two or more PDU headers using programmable pipelines of a switching Application-Specific Integrated Circuit (ASIC) in the IP switch; and
      computing, as the storage I/O metrics, storage I/O metrics in an ASIC data path associated with transport of Non-Volatile Memory express (NVMe)/TCP SAN traffic.

18. The one or more non-transitory computer readable medium of claim 14, the operations further comprising:
   receiving Non-Volatile Memory express (NVMe)/TCP SAN traffic utilized by an IP switch to deduce, via non-sampled examination of packets to extract, at line rate, storage I/O metrics as the storage I/O metrics, storage I/O metrics as the storage I/O metrics, the NVMe/TCP SAN traffic transiting the IP switch independent of host/storage vendor.

19. The one or more non-transitory computer readable medium of claim 14, the operations further comprising:
   maintaining, by an Internet Protocol (IP) switch, per-Initiator Port, Target Port, NameSpaceID (ITN) metrics as the storage I/O metrics.

20. The one or more non-transitory computer readable medium of claim 14, wherein extracting further comprises extracting the metadata header,
   the operations further comprising:
      parsing the two or more PDU headers in two or more corresponding Non-Volatile Memory express (NVMe)/TCP PDUs in the single TCP segment, based at least in part on the metadata header.

* * * * *